(12) United States Patent
Greco et al.

(10) Patent No.: US 10,928,514 B2
(45) Date of Patent: Feb. 23, 2021

(54) ULTRASOUND METHOD AND SYSTEM FOR EXTRACTING SIGNAL COMPONENTS RELATING TO SPATIAL LOCATIONS IN A TARGET REGION IN THE SPATIAL AND TEMPORAL FREQUENCY DOMAIN

(71) Applicant: ESAOTE SpA, Genoa (IT)

(72) Inventors: Danilo Greco, Genoa (IT); Marco Crocco, Ovada (IT)

(73) Assignee: ESAOTE S.p.A., Genoa (IT)

( * ) Notice: Subject to any disclaimer, the term of this patent is extended or adjusted under 35 U.S.C. 154(b) by 337 days.

(21) Appl. No.: 16/025,646

(22) Filed: Jul. 2, 2018

(65) Prior Publication Data
US 2019/0011554 A1   Jan. 10, 2019

(30) Foreign Application Priority Data
Jul. 6, 2017   (EP) .................................... 17179972

(51) Int. Cl.
*G01S 15/89*   (2006.01)
*G01S 7/52*   (2006.01)
(Continued)

(52) U.S. Cl.
CPC .......... *G01S 15/8977* (2013.01); *G01N 29/07* (2013.01); *G01S 7/52028* (2013.01);
(Continued)

(58) Field of Classification Search
CPC ............ G01S 15/8977; G01S 7/52028; G01S 7/52046; G01S 15/8915; G01S 15/8979; G01N 29/07; G01V 1/30
See application file for complete search history.

(56) References Cited

U.S. PATENT DOCUMENTS

| 4,259,733 A | 3/1981 | Taner et al. |
| 5,628,320 A | 5/1997 | Teo |

(Continued)

FOREIGN PATENT DOCUMENTS

| EP | 2 332 467 A1 | 6/2011 | |
| EP | 3425423 A1 * | 1/2019 | ............. G01N 29/07 |

(Continued)

OTHER PUBLICATIONS

Salles Sebastien et al., "Plane Wave Transverse Oscillation (PWTO): An Ultra-Fast Transverse Oscillation Imaging Mode Performed in the Fourier Domain for 2D Motion Estimation of the Carotid Artery", 2014 IEEE 11$^{th}$ International Symposium on Biomedical Imaging (ISBI), IEEE, Apr. 29, 2014, pp. 1409-1412, XP032778994.

(Continued)

*Primary Examiner* — Daniel Pihulic
(74) *Attorney, Agent, or Firm* — Dickinson Wright PLLC

(57) ABSTRACT

Ultrasound method for extracting information from signal components relating to spatial locations in a target region such as for example image reconstruction in the spatial and temporal frequency domain comprises the steps of:
  Transmitting an unfocussed acoustic wave in a target region;
  extracting information of the scatterers in the target region from signal components relating to spatial locations of the target region by applying a backpropagation algorithm to the radiofrequency signals generated by transformation of the reflected acoustic waves and which radiofrequency signals has been transformed in the frequency-wavenumber domain and transformed back to the time spatial domain after backpropagation processing, the system provides the further step of optimizing the extracted information by applying corrections to the radio frequency received signals in the frequency-wavenumber domain.

The invention relates also to an ultrasound system for carrying out said method.

20 Claims, 18 Drawing Sheets

(51) Int. Cl.
*G01N 29/07* (2006.01)
*G01V 1/30* (2006.01)

(52) U.S. Cl.
CPC ...... *G01S 7/52046* (2013.01); *G01S 15/8915* (2013.01); *G01S 15/8979* (2013.01); *G01V 1/30* (2013.01)

(56) References Cited

U.S. PATENT DOCUMENTS

| | | |
|---|---|---|
| 5,720,708 A | 2/1998 | Lu et al. |
| 5,938,611 A | 8/1999 | Muzilla et al. |
| 8,287,456 B2 | 10/2012 | Daigle |
| 2003/0149357 A1 | 8/2003 | Liu |
| 2011/0144497 A1* | 6/2011 | Kim .................. G01S 15/8977 600/443 |
| 2015/0293222 A1 | 10/2015 | Huang et al. |
| 2017/0090028 A1* | 3/2017 | Djordjev ................ G01S 7/521 |
| 2019/0011554 A1* | 1/2019 | Greco ................ G01S 15/8979 |

FOREIGN PATENT DOCUMENTS

| | | |
|---|---|---|
| WO | WO 2009/158399 A1 | 12/2009 |
| WO | WO 2017/051359 A1 | 3/2017 |

OTHER PUBLICATIONS

European Search Report dated Jan. 19, 2018, which issued in EP Application No. 17179972.9.

* cited by examiner

ULTRASOUND METHOD AND SYSTEM FOR EXTRACTING SIGNAL COMPONENTS RELATING TO SPATIAL LOCATIONS IN A TARGET REGION IN THE SPATIAL AND TEMPORAL FREQUENCY DOMAIN

BACKGROUND

The present disclosure relates to a method and a system for ultrasound extracting signal components relating to spatial locations in a target region in the spatial and frequency domain in which an unfocussed acoustic wave, such as a plane ultrasonic wave, a cylindric or a spherical wave is generated and transmitted into a target and in which the received signals generated by the reflected beams backscattered from the structure of the target region are processed by back propagation in order to obtain data of the structure of the target region and to generate an image of the structure of the target region from the said data.

Ultrasonic imaging methods using the back-propagation technique as described above are known in the art. These methods allow to activate transducers simultaneously or with such delays as to generate an unfocused or partly focused beam. Unfocused beams may be, for instance, planar acoustic waves or a spherical or curved wave or planar or curved steered waves. These methods unlike the so-called delay and sum (DAS) methods do not carry out beamformer focusing of transmit beams of transducer components on predetermined lines or points by selective activation, with predetermined different delays, of the individual transducers.

As an equivalence exists between the signal propagation time and the signal penetration depth within a body under examination, an equivalence also exists between the signals backscattered from the body under examination in the two forms, i.e. in the time domain and in the frequency domain. These two forms may be obtained by using Fourier transforms. The backscattered signal received by the receiving transducers is a time-domain signal, which may be transformed into a frequency-domain signal. This transformation, substantially corresponding to a spectrum analysis, allows to use the so-called back propagation processing method, which instead of time, uses, the distance of a predetermined propagation plane from a reference plane, the latter corresponding to the plane where the receive signals are detected by receiving transducers. This technique allows to calculate, from propagation depths within the body under examination, the structure of the backscattered signal by translating the reference plane in the direction of propagation in the body under examination. In this way, structural information may be obtained about scattering elements in the region under examination, in any propagation plane. Inverse transformation of the signal/s so reconstructed from the frequency domain back into the time domain, provides the data for generating an ultrasonic image.

As is apparent from documents U.S. Pat. Nos. 5,628,320 and 5,720,708, the back-propagation method allows to generate a complete set of data from the received signals which data corresponds to receive signal components related to spatial locations of scatterers in the region in which a transmit beam has been transmitted, without requiring any focusing along multiple adjacent scan lines both during transmission and reception. A complete set of data is generated for each transmit pulse for example by using a so-called plane wave method (PWM), unlike the method in which transmit beams are successively focused along individual scan lines, and release a transmit pulse for each line, a so called Delay and Sum method (DAS). The above-mentioned documents U.S. Pat. Nos. 5,628,320 and 7,720,708 provide a detailed and in-depth description of the back-propagation theory and method, and the information contained therein is intended as a part hereof. These transformation steps provide advantages that are better shown in the two above mentioned documents.

Back-propagation techniques can be also applied for obtaining data from receive signals which are due to different transmit events according to the synthetic aperture technique. According to this technique each transducer element or each group of transducer elements of an array of transducer elements emits in a sequence a spherical wave or a sequence of plane waves with different steering angles Different processing methods and algorithms are known for backpropagating the received echo signals in order to obtain information about the structure of the target region and to extract the data consisting in the signals components related to spatial locations in a target region. One of these methods and algorithms is the so called "seismic migration" which is a method developed and used in geophysical applications. One embodiment of this method is for example described in U.S. Pat. No. 4,259,733, in relation to obtaining seismic traces synthesizing the response of a subsurface formations to a cylindrical or plane wave from a succession of shot point along a seismic line or profile. US2003149357 describes an embodiment applying the seismic migration method in ultrasound diagnostic imaging. In this embodiment, plane waves are transmitted at different incident angles, and the radio frequency echo waveforms received by the elements in an array are processed with a Fourier transform. One frame of "raw" image is generated for each transmitted plane wave. According to the disclosed method, the formation of each raw image includes: temporal Fourier transform of radio frequency echo signal from each element; phase rotation; spatial Fourier transform; complex interpolation; and an inverse spatial-temporal Fourier transform. This method does not require the synthesis of limited diffraction beams and is computationally more efficient compared to conventional delay-and-sum approach. These raw images are combined coherently to enlarge spatial frequency coverage and enhance lateral resolution. The resolution-enhanced images are further combined incoherently to achieve speckle reduction.

Seismic migration is based on the backward propagation of the acoustic field collected by the probe but requires ideal conditions, consisting in infinite and continuous probe aperture, in the absence of additive noise to the sensors and the absence of thermoviscous attenuation, infinite bandwidth of the signal. When these conditions are present, the reconstruction of the scatterers distribution is exact, because it is based on the solution of wave equation given a boundary condition. However, the above conditions are not met totally or in part in real imaging situations and such non-idealities make that the mere application of the seismic migration method and algorithm can lead to a not optimal imaging results so that the advantages of the higher frame rate are at least partially reduced by the non-optimal image quality.

In particular, seismic migration does not take into account per se the deviations from ideal theoretical conditions such as: finite probe aperture, single element directivity, additive electronic noise, frequency dependent tissue absorption. Such issues are tackled in DAS at the cost of increased algorithm complexity (VFC filters, dynamic aperture etc.) and often in an empirical way.

SUMMARY

The present disclosure relates to an ultrasound method and system for extracting signal components relating to spatial locations in a target region in the spatial and temporal frequency domain, one object being to improve the quality of the data obtained by this method and this system in order to fully achieve the advantages of high frame rates provided by the seismic migration method.

Signal components or receive signal components related to spatial locations in a target region or spatial locations of scatterers in a target region may be aimed to different purposes among which reconstructing an ultrasound anatomical images based on the intensity of the signal components, ultrasound colour images, measuring elastic coefficient of the target region and other.

It has to be noticed that although for simplicity sake the following description and in the detailed description is focussed mainly on the specific case of the image reconstruction, this example should be considered non-limiting and extending to any kind of variant result or feature that can be extracted by the said signal components with the method and the system according to embodiments herein, by simply processing the data in a way to extract the desired features.

Another object of embodiments herein is to provide a method and system which is improved in such a way as to delete the contributions of evanescent waves from the k-space generated by the Fourier transform.

Still another object is to provide an improved method and system which consider the distortion of the spectrum of received signals due to frequency-dependent tissue absorption.

A further object is to provide an improved method and system which consider the depth-dependent cut off of spatial frequencies in the received signals, due to the probe finite aperture.

Another object is to provide an improved method and system which copes with the directivity of the individual transducers.

Still another object is to provide for an improved method and system which works in a phase-quadrature (IQ) RF domain, thus allowing pixel based beamforming.

According to a first aspect, embodiments herein relate to a method for ultrasound image reconstruction in the spatial and temporal frequency domain comprising:

Transmitting an unfocussed acoustic wave in a target region;

Extracting data comprising in signal components relating to spatial locations in a target region by applying a backpropagation algorithm to the radiofrequency signals generated by transformation of the reflected acoustic and which radiofrequency signals has been transformed in the frequency-wavenumber domain and transformed back to the time spatial domain after backpropagation processing, the system provides the further step of optimizing the extracted data by applying corrections to the radio frequency received signals in the frequency-wavenumber domain.

According to one further embodiment, there is provided a method for ultrasound extracting signal components relating to spatial locations in a target region in the spatial and temporal frequency domain comprising:

a) generating an acoustic unfocussed wave and transmitting the said acoustic unfocussed wave into a target region of a body under examination;

b) receiving the reflected acoustic waves generated by reflection of the said unfocussed wave due to the scatterer in the target region and transforming the said reflected acoustic waves in electric received signals;

c) applying a Discrete Fourier Transform (DFT) to received data consisting in the said received signals;

d) backpropagating the transformed received data inside the target region in which the unfocussed acoustic wave has been transmitted;

e) transforming back the backpropagated data by applying an inverse Discrete Fourier Transform to the said backpropagated data and determining, for each spatial location in the target region, a temporal window for which the backpropagated signal is representative of the echo backscattered by the given spatial location;

and which method comprises the further steps of applying correction parameters to the received data transformed by the Discrete Fourier Transforms at step a) before to carrying out the following steps.

According to an embodiment, the acoustic signals reflected by the target region in response to the plane wave transmitted in the said target region are acquired by a probe having a predetermined number of transducer element each one forming a receiving channel and the radio frequency data (RF-data) acquired by each channel within a certain depth range corresponding to a certain time range is ordered in a matrix of RF received data, the matrix having the size corresponding to the number of samples in the said time range times the number of probe channels. According to this embodiment, the method comprises the following steps:

Acquiring a matrix of RF data of size number of receive signal samples times the number of probe channels, in response to the transmission into the target region of the unfocussed wave;

Performing a Discrete Fourier Transform on the said RF data matrix and compute the corresponding vectors of temporal frequencies e and wavenumbers k and generating a frequency and wavenumber domain (k-space) matrix of the received signals;

For each depth range inside the target region repeating the following steps:

Computing a propagation matrix according to a backpropagation algorithm;

Providing a correction matrix which elements are computed for carrying out at least one of the following corrections:

Delete the contributions of evanescent waves from the k-space and/or compensating the distortion of the spectrum of received signals due to frequency-dependent tissue absorption and/or compensating the depth-dependent cut off of spatial frequencies in the received signals, due to the probe finite aperture and/or coping with the directivity of the individual transducers, the said correction matrix being a masking matrix of predetermined regions of the spatial frequency-wavenumber matrix;

Multiply element wise the said correction matrix with the data matrix of Discrete Fourier transformed RF signals obtaining a data matrix of corrected Discrete Fourier Transformed RF signals;

Multiply element wise the propagation matrix by the said data matrix of corrected Discrete Fourier Transformed RF signals;

Perform an inverse Discrete Fourier Transform on the resulting matrix;

For every position along the extension of the transducer array consider the signal in a given range of times as representative of the scatterers intensity at a location along a line at the said position and at each depth along the said line;

Extracting information from the signal components relating to spatial locations in a target region such as for example generating an image by using the scatterer intensities at each of said locations.

According to an embodiment, the correction function which in this case consist in a correction or masking matrix is combined with a smoothing or transition function between the zones of the data matrix comprising the Discrete Fourier Transformed receive data at the boundary between regions of the said data matrix which has to be masked or maintained.

As it will appear more clearly in the following this smoothing or transition function can be applied also for smoothing the boundary of the regions to be masked and the regions to be maintained also for masking matrices intended to compensate further effects like compensating the distortion of the spectrum of received signals due to frequency-dependent tissue absorption and/or compensating the depth-dependent cut off of spatial frequencies in the received signals, due to the probe finite aperture and/or coping with the directivity of the individual transducers, the said correction matrix being a masking matrix of predetermined regions of the spatial frequency-wavenumber matrix;

According to an embodiment, the smoothing or transition function provides for giving values different from 0 or 1 to the elements in the masking matrix along the boundary between the region of the data matrix to be masked and the region to be maintained.

The backscattered acoustic waves are sensed by an ultrasound probe comprising an array of electroacoustic transducers which transform the impinging acoustic energy in a corresponding electric signal. Each transducer element has a predetermined position in the array. The array may be one dimensional or two dimensional and may extend on a plane surface or on an arched dimensional or three-dimensional surface. The backscattered acoustic waves are received for a certain time interval corresponding to the position of the scatterers at a predetermined depth of propagation of the transmit wave in the target region. Each transducer in the array having a unique position in the array receives thus an acoustic signal for a predetermined interval of time, generating an electric signal of corresponding duration in time. Each signal received by each transducer element is sampled in time at a predetermined frequency thus transforming the continuous received signal in a sequence of signal samples acquired with a certain sampling frequency. Thus, the received RF signals generated by the transducer array can be ordered in a two dimensional or three dimensional matrix in which each row corresponds to the position of a transducer and each element of the row forming the lines of the matrix are the samples at a certain time of the time dependent received signal. This geometrical condition is represented for the simplest case of a plane wave and a linear array of transducer elements.

In FIG. 1 a schematic linear array 1 of transducer elements Tn is shown. The situation illustrated is relative to the receiving of the reflected acoustic waves by the transducer T1. Transducer T1 transforms the acoustic signal in a received radiofrequency electric signal. The sampling with a predetermined sampling frequency the received radiofrequency signal for the duration of the acoustic reflect wave is represented schematically with the diagram in which the signals samples 110 of the signal 100 are represented in the coordinate system representing amplitude A versus time t. A first line 1 of a matrix of radiofrequency signals samples representing the acoustic filed generated by the back scattering of the transmitted wave in the target region is generated by the samples 110 of the signal 100. Executing the above steps for each transducer provides the data for filling the radiofrequency received signal matrix, which is representative of the reflected wavefield and thus the structure of the target region.

In accordance with the possibility of generating a matrix of radiofrequency received signals which describes the reflect wavefield in the time domain, it appears that the above method steps can be applied by using simple matrix operations which do not represent a high computational load for the processing unit.

An embodiment of the present method provides for the following steps:

Transmitting unfocussed ultrasound waves into a target region;

Receiving the backscattered acoustic waves by means of an array of transducer and transforming the received backscattered acoustic waves in corresponding electric signals;

Sampling at a predetermined frequency and over a predetermined time interval the received signals of each transducer element and generating a matrix of received radiofrequency signals in the space-time domain, in which each row is formed by signal samples at a certain identical time instant and each line represents the signal samples generated by each transducer element;

Processing the matrix of radiofrequency signals in the space time domain by a Discrete Fourier Transform generating a matrix of received signals in the spatial frequency-wavenumber domain;

Applying a correction to the matrix of received signals in the frequency-wavenumber domain by an element by element multiplication of the said matrix of received data with a correction matrix in the form of a masking matrix or a combination of two or more masking matrices operating in selecting regions of the received signal signals in the frequency-wavenumber domain comprising elements satisfying the optimization conditions and regions of the said matrix comprising elements which do not satisfy optimization Processing the masked matrix of received signals in the frequency-wavenumber domain by a backpropagation algorithm coded in the form of a backpropagation matrix and generating a matrix of backpropagated received data in the frequency-wavenumber domain;

Processing the matrix of backpropagated received data in the frequency-wavenumber domain by Inverse Discrete Fourier Transforms generating backpropagated received data matrix in the space-time domain;

Extracting information from the signal components relating to spatial locations in a target region such as for example reconstructing an image from the said backpropagated received data matrix in the space-time domain.

According to a further embodiment, transmission of the ultrasound beam may be carried out using a coding transmission technique in combination with a compression filter for the received signals. Coded transmission is a well-known technique in ultrasound and for example is disclosed in U.S. Pat. No. 5,938,611 or in WO2017051359 which are incorporated by reference.

Different coding types are known and can be used in combination in embodiments herein. Among these types firstly the "chirp" type coding (linear FM), Barker Codes and Golay codes (performed in PSK) have to be mentioned.

In combination with coding an embodiment herein provides for transmitting two or more coded ultrasound waves simultaneously each of the two or more waves having different features such as for example different steering angles so to allow a further increase in frame rate.

The coding and decoding steps may be carried out in the frequency-wave number domain using a correction function in the form of a masking matrix.

According to an example, a criterion for determining which elements of the frequency-wavenumber matrix has to be maintained and not masked away is the fact that these elements lead to a signal to noise ratio above a certain minimum threshold.

According to a further criterion which may be applied consist in the fact if the spatial frequency range leads to evanescent waves from the frequency-wavenumber domain.

According to still a further embodiment which may be provided alone or in combination with the above-mentioned ones provides a masking matrix corresponding to an Hilbert filter in the frequency wavenumber domain allowing thus to apply a pixel beamforming technique.

According to a further embodiment, since the above-mentioned corrections, namely:
Delete the contributions of evanescent waves from the k-space and/or compensating the distortion of the spectrum of received signals due to frequency-dependent tissue absorption and/or compensating the depth-dependent cut off of spatial frequencies in the received signals, due to the probe finite aperture and/or coping with the directivity of the individual transducers,
depend on the system parameters and not from the acquired data which thus are computed off line allowing to generate a pre-computed correction matrix which can be also multiplied off line with the propagation matrices. This allows not to affect the overall computational load.

It has to be noticed that the correction matrix may change for different depths locations of the target structure so that the step of providing the correction matrix is to be carried out for each iteration of the method for each depth.

By applying the corrections for optimizing the data obtained by the seismic migration method or other back-propagation methods to the received signals transformed in the frequency-wavenumber domain, the corrections and or compensations of system determined aberrations or defects can be easily obtained by providing masking matrices. Applying the element by element multiplication of the received signals in the frequency-wavenumber domain the elements the computational load is dramatically reduced in respect to the filtering processes needed in a traditional Delay and Sum method. The elements of the frequency-wavenumber matrix which do not satisfy the optimization criteria and introduces defects are directly eliminated and only the ones leading to a high quality image are maintained and subjected to the back propagation process and to the Inverse Discrete Fourier transformation leading to signals useful for image reconstruction.

As it will appear also in the following it has to be noticed that the process can be carried out by a generic processor which executes a software comprising the instructions for configuring the generic hardware such as to be able to carry out the above described processing steps.

According to a further embodiment, a masking matrix can be generated corresponding to a Hilbert filter in the frequency-wavenumber domain. This masking matrix allows to work in a phase-quadrature domain and to apply the technique of pixel beamforming.

According to a further embodiment, as a back-propagation method a so called seismic migration method is provided.

Referring for simplicity to a specific embodiment in which the unfocussed wave is a plane acoustic wave the algorithm is based on the solution of the wave equation in a homogeneous medium, given a boundary condition. In particular the pressure field sampled by the probe at depth z=0, p(x, 0, t) can be backpropagated to recover the pressure field at a generic depth p(x, z, t). Hence the ultrasound image given by the scatterers distribution can be recovered by evaluating p(x, z, t) at given times t dependent from each location (x, z).

Here
the term x is the so called azimuth axis which is parallel to the extension of the array of transducer elements transverse to the direction of propagation of the acoustic waves generated by the said transducer elements;
z is the depths in the direction of a line of propagation of the acoustic waves at a position x along the extension of the transducer elements of the array of transducer elements;
t is the time.

The solution of the wave equation:

$$\frac{\partial^2 p(x, z, t)}{\partial z^2} = \frac{1}{c^2} \frac{\partial^2 p(x, z, t)}{\partial t^2} - \frac{\partial^2 p(x, z, t)}{\partial x^2}$$

is based on the 2D Discrete Fourier Transform across time and azimuth coordinates of the pressure field sampled by the probe.

$$P(k_x, 0, \omega) = \sum_x \sum_\omega P(x, 0, t) e^{(-j(k_x x + \omega t))}$$

The solution at a generic depth z for a component $(k_x, \omega)$ is given by:

$$P(k_x, z, \omega) = P(k_x, 0, \omega) e^{j k_z z}$$

Where:

$$k_x = \frac{\omega}{c} \sqrt{1 - \left(\frac{c k_x}{\omega}\right)^2}$$

The matrix of the radiofrequency data generated by the acoustic signals received by each of the transducers elements having a position x and sampled in relation to time t is transformed by the 2D Discrete Fourier Transform in a Frequency-wavenumber space consisting in a matrix which elements are the $(k_x, \omega)$ at different depths in the target region.

The said acoustic signals received by the transducer elements are generated by reflection of the plane wave by the scatterers distributed within the target region The final pressure field at depth z is given by the inverse 2D Fourier transform:

$$p(x, z, t) = \sum_{k_x} \sum_\omega P(k_x, z, \omega) e^{(j \omega t)} e^{(j k_x x)}$$

Although the above embodiment is limited for simplicity sake to the plan wave and two-dimensional case variant embodiments are possible according to the same principle when for example the probe instead of a linear array of transducer elements is provided with an array of transducer elements distributed on an arched surface, such as in the so called convex probes. In a further variant embodiment, the probe may be of the kind in which the array is two-dimensional and in which the transducer elements are distributed over a plane surface or over a spherical surface, i.e. a sector of a spherical surface. In this case, it is straightforward for a skilled person to correspondingly upgrade the above equations in order to consider the different probe geometries relating to the distribution of the transducer arrays. A further variant embodiment the method is not limited to 2D acquisitions and is combined with a 3D acquisition technique.

According to the above embodiment related to a plane acoustic wave for the unfocussed wave generated by a linear probe and transmitted into the target region, the method generic method disclosed above provides the following steps:

generating a plane acoustic wave and transmitting the said plane acoustic wave into a target region;

receiving the backscattered acoustic signals from the scatterers distribution in the said target region by each transducer element or channel of a transducer array of a probe and sampling along a certain period of time the radio frequency signals generated by each transducer element or channel of the probe which radio-frequency signals correspond to the received acoustic signals by each transducer element;

generating a matrix of the said radio frequency received signals having a size corresponding to the number of samples times the number of probe transducer elements or channels;

performing a Discrete Fourier Transform on the RF data matrix along the axis corresponding to time and to the azimuth of the array of transducer elements, i.e. the axis along which the transducer elements are aligned side by side, and compute the corresponding vectors of temporal frequencies s and wavenumbers k;

For each depth inside the target region:

Compute the backpropagation matrix according to the seismic migration algorithm by determining each element by the equation $P(k_x,z,\omega)=P(k_x,0,\omega)e^{jk_z z}$ In which $k=f(k_x,\omega)$;

Calculating a correction matrix or provide a correction matrix pre-calculated off line, the correction matrix elements being calculated as a function of acquired data independent system parameters which provide for causing at least one of the following effects:

Deleting the contributions of evanescent waves from the k-space and/or compensating the distortion of the spectrum of received signals due to frequency-dependent tissue absorption and/or compensating the depth-dependent cut off of spatial frequencies in the received signals, due to the probe finite aperture and/or coping with the directivity of the individual transducers, the said correction matrix being a masking matrix of the received data in the frequency-wavenumber domain matrix;

multiplying element wise the correction matrix with the data matrix of Discrete Fourier transformed RF signals obtaining a data matrix of corrected Discrete Fourier Transformed RF signals;

multiplying element wise the propagation matrix by the data of the matrix of corrected Discrete Fourier Transformed RF signals;

Performing an inverse 2D Discrete Fourier Transform on the resulting matrix of the preceding step;

For every azimuth position, i.e. for every position corresponding to the position of a transducer element consider the signal in a given range of times as representative of the scatterer intensity at a location defined by the said azimuth position and at a certain depth inside the target region;

Extracting information from the signal components relating to spatial locations in a target region such as for example reconstructing an image of the distribution of the scatterers in the target region from the said signals representative of the scatterers intensity at each location in the target region.

According to an embodiment, the correction matrix being applied to the received data transformed in the frequency-wavenumber domain matrix is in the form of one or more masking matrices by which the data of only certain region of the frequency-wavenumber domain matrix are selected for extracting information from the signal components relating to spatial locations in a target region such as for example generating an image of the structure of the target region relatively to the scatterer distribution in this region by applying the back propagation and the inverse Discrete Fourier transform on the back propagated received signals. The structure of the masking matrix for selection by pointwise multiplication of this masking matrix with the received signals transformed in the frequency-wavenumber domain depends on the effect that this masking matrix has to compensate in order to obtain optimum image qualities.

Each kind of masking matrix comprising regions relative to data to be masked and data to be maintained in the matrix of the Discrete Fourier Transformed received signal components relative to different locations in the target region and a smoothing or transition operator is provided which attributes values different from 0 or 1 to the elements of the masking matrix along the boundary separating the said regions to be masked and the said regions to be maintained Detailed examples of the computation of the correction matrix will be disclosed in the following.

According to a further aspect, embodiments herein relate to an ultrasound system for ultrasound image reconstruction in the spatial and temporal frequency domain, the system comprising:

a probe comprising an array of transducer elements capable of transforming an electric signal in an ultrasound acoustic signal and vice versa capable of transforming acoustic waves falling onto the transducer elements into electric radio frequency receive signals;

a transmit beamformer unit generating electric signals for driving each of the transducer elements of the probe and configured to feed the transducer elements for generating an unfocussed wave directed into a target region;

a radio frequency received signals processing unit configured to process the radio frequency received signals by applying a back-propagation algorithm to the radiofrequency receive signals to reconstruct the structure of the target region, i.e. the distribution of the scatterers in the target region from the radio frequency receive signals;

the said radio frequency received signals processing unit comprising:

a first processing subunit configured to apply a Discrete Fourier Transform to the radio frequency received data;

a second processing subunit configured to construct a back-propagation function to be applied to the transformed radio frequency received signals;

a third processing subunit configured to apply an inverse Discrete Fourier Transform to the transformed radiofrequency received signals;

a fourth processing subunit configured to calculate in real time or to store a correction function of the radiofrequency received signals and to process the said radio frequency received signals before feeding the said signals to the second processing sub unit;

a receive data processor for extracting information from the signal components relating to spatial locations in a target region such as for example an image reconstruction processing unit generating image data of the structure of the target region from the signals determined by the said third processing subunit.

According to an embodiment the processing unit and the processing subunits may be in the form of generic hardware comprising a generic processor and peripherals and a memory for storing software programs coding the instructions to the generic hardware processor for configuring the processor and the peripherals in order to carry out the functions of the above mentioned subunits. According to variant embodiments the said generic hardware processor can be a GPU a DSP or another kind of microprocessor combined with a memory for storing the executable program comprising coding the instructions for executing the tasks of the above-mentioned processing units and subunits.

DETAILED DESCRIPTION

While multiple embodiments are described, still other embodiments of the described subject matter will become apparent to those skilled in the art from the following detailed description and drawings, which show and describe illustrative embodiments of disclosed inventive subject matter. As will be realized, the inventive subject matter is capable of modifications in various aspects, all without departing from the spirit and scope of the described subject matter. Accordingly, the drawings and detailed description are to be regarded as illustrative in nature and not restrictive.

In particular, the term extracting information from the signal components relating to spatial locations in a target region indicates any kind of information about qualitative and/or quantitative features of scatterers in a target region and at different spatial locations in the said region that can be retrieved form receive signal components corresponding to ultrasound back scattered acoustic waves by the said scatteres. Non-exhaustive examples of the features of the scatterer in the target region are image reconstruction, measurements of the local elasticity parameter and/or velocity of moving scatterer in the target region.

In the following description reference is made to image reconstruction as one of the possible different alternatives of extraction of information from the signal components of the receive signals at spatial locations in a target region. Nevertheless, this reference should not be interpreted as a limiting feature but it comprises all the possible variants of information which the skilled person is aware of and does not need to depart from his ordinary skills for processing the data.

Figure 2:
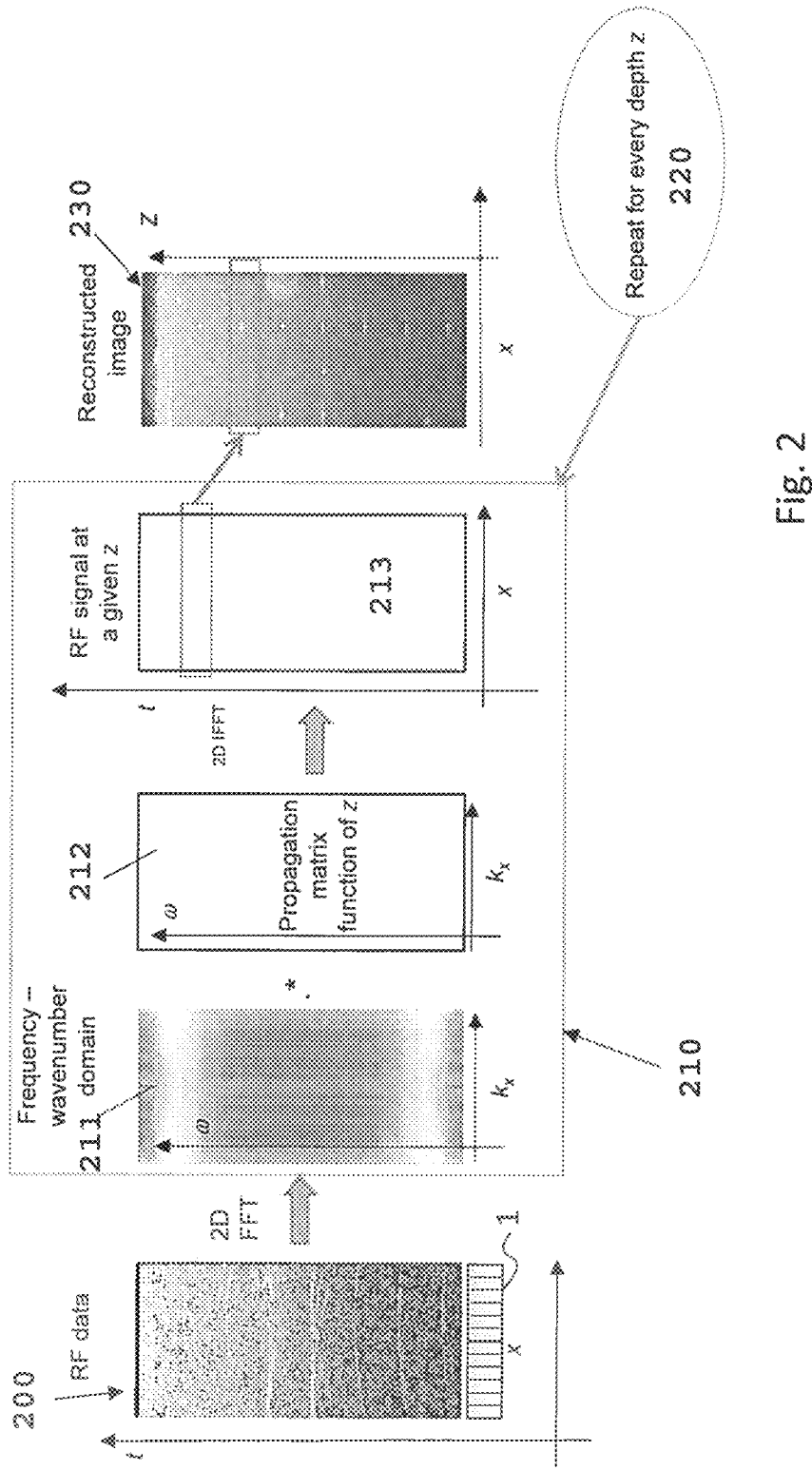
FIG. 2 is a diagram representing a backpropagation method according to the state of the art.

FIG. 2 illustrates a graphic representation showing the steps of an ultrasound imaging method according to the state of the art and using an unfocussed transmit beam propagating along an entire target region to be imaged and a backpropagation method such as for example the so called "seismic migration" in order to provide radiofrequency data representing the structure of the target region, i.e. the distribution of the said region of the scatterers and the kind of scatterers. With 1 there is indicated an array of transducers comprising transducer elements. In the example the transducers elements are disposed one besides the other along a direction X and form a line of transducer elements positioned on a plane. This kind of geometry is typical for so called linear probes and the example is limited to this kind of probe for sake of simplicity, the method not being limited to such kind of probes but being also possible to be applied in combination with convex probes in which the line of transducers is positioned along a curved surface or other geometries. Also two dimensional geometries of the probe can be used in combination with the backpropagation imaging method such a phase array probes or similar.

Figure 1:
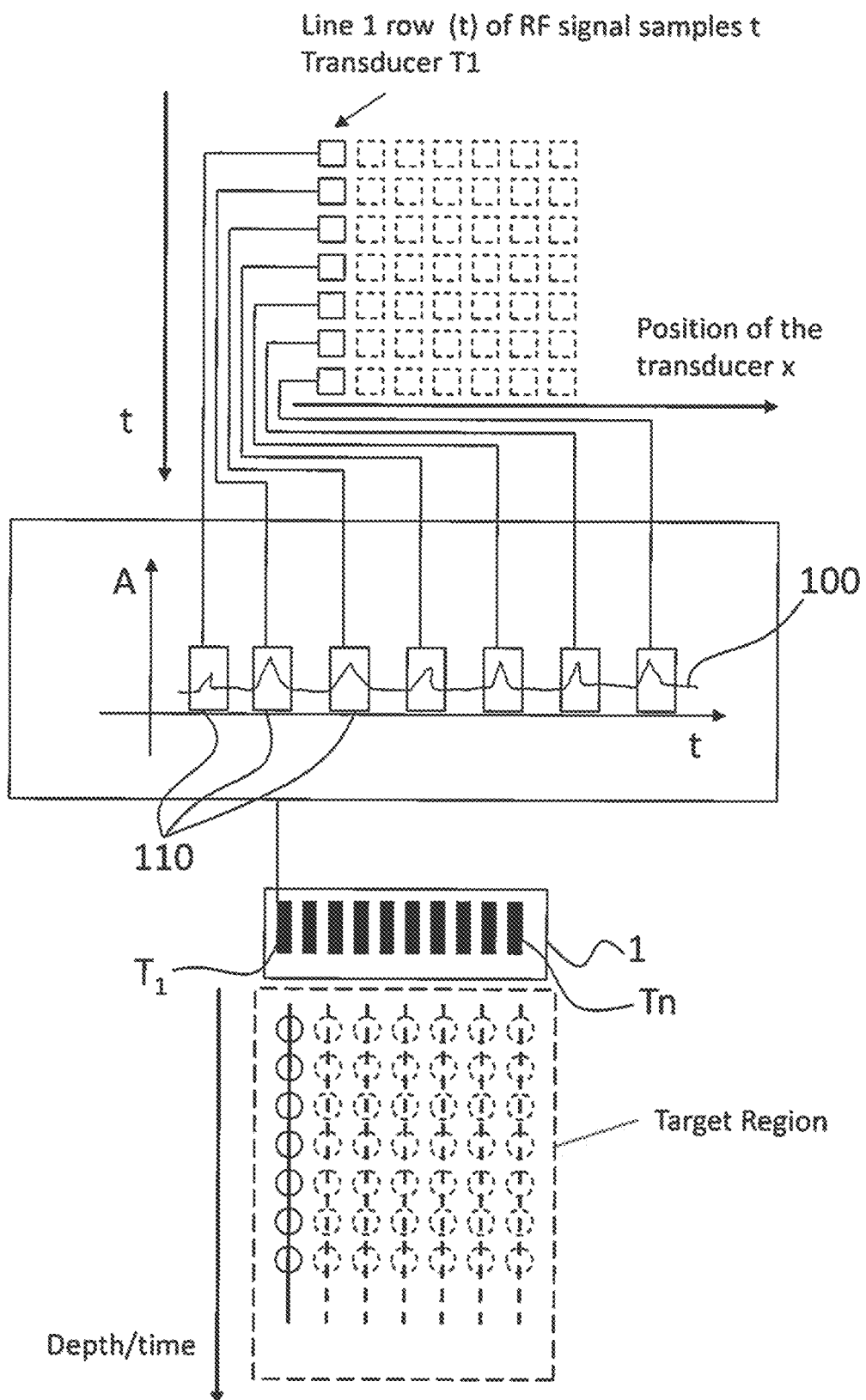
FIG. 1 is a diagram representing the principle of providing a matrix of radiofrequency received signals representing the wavefield of the backscattered acoustic wave by the target region.

As already explained in relation to FIG. 1, the backscattered acoustic waves in response to the unfocussed, for example plane acoustic transmit waves are transformed in electric radiofrequency signals received by each transducer element over a certain receipt interval and are sampled with a certain sample frequency over time said time interval, generating for each transducer element a sequence of radiofrequency signal samples which samples are ordered in a matrix in which each line refers to a transducer and each row to a sample related to a certain time instant within the sequence of samples of the received radiofrequency signal. The matrix which elements are the said radiofrequency receive signal samples is represented by the corresponding image of the reflected not yet backpropagated acoustic waves indicated with RF data 200. In relation to these data it has to be noted that the time t corresponds uniquely to a predetermined depth of penetration z of the transmit wave in the target region. So that the latest arriving signal components are the ones which are reflected by the scatterers lying deeper inside the target region with reference to a direction of propagation of the transmitted wave and starting from the emitting surface of the transducer elements of the array 1.

The backpropagation method according to the state of the art is an iterative processing which is carried out for each different depth z inside the target region since the structure of the target region relating to the distribution of the scatterers over this region is reconstructed by a backpropagation function which is a function of the depth z. This is represented in FIG. 2 by the box 210 and by the iteration step 220.

The example of backpropagation according to the state of the art disclosed in FIG. 2 relates to an embodiment in which the radiofrequency signal samples in the received RF data matrix in the space-time domain are transformed by a two dimensional Discrete Fourier Transform (2D FFT) in received data samples in the frequency-wavenumber domain (k, ω), so called K-space. Relating to the specific example which is directed to a linear probe, the wavenumber k which is relevant is the one along the direction x of the lateral extension of the linear probe, defined herein as azimuthal direction of the transducer array. As represented in FIG. 2 the result of the 2D Discrete Fourier Transform is the data matrix 211. The method further comprising generating as a function for each depth z inside the target region, i.e for each depth in the direction of propagation of the waves from the transducer array into the target region, a back-propagation matrix 212 which is multiplied element wise by the data matrix 211, i.e the matrix of the transformed RF data. By submitting the backpropagated data to a 2D Inverse Discrete Fourier Transform (2D IFFT) a matrix 213 of backpropagated radiofrequency signals at a given depth z is obtained.

Repeating the above steps for each depth z, and ordering the back-propagated RF signal in relation to the different depths an image is then reconstructed in the space time domain representing the distribution of the scatterers in the target region as shown by the image 230 in which the different scatterers appears as white points on the image area.

According to the computation of the back-propagation function and matrix, this requires the solution of the wave equation in an homogeneous medium with predetermined boundary conditions.

In the following a non-limiting example of computation of the elements of the backpropagation matrix is described which is applied to the specific example of a plane wave and using a seismic migration algorithm and in two dimensions x, z, i.e in a plane oriented in the propagation direction of the unfocussed wave in the target region and parallel to the azimuthal direction of the array. The algorithm is based on the solution of the wave equation in a homogeneous medium, given a boundary condition. In particular, the pressure field sampled by the probe at depth z=0, p(x, 0, t), can be backpropagated to recover the pressure field at a generic depth p(x, z, t). Hence, the ultrasound image given by the scatterers distribution can be recovered by evaluating p(x, z, t) at given times t dependent from each location (x, z). The solution of the wave equation:

$$\frac{\partial^2 p(x, z, t)}{\partial z^2} = \frac{1}{c^2} \frac{\partial^2 p(x, z, t)}{\partial t^2} - \frac{\partial^2 p(x, z, t)}{\partial x^2}$$

Is based on the 2D Discrete Fourier Transform across time and azimuth coordinates of the field sampled by the probe:

$$P(k_x, 0, \omega) = \sum_x \sum_\omega P(x, 0, t) e^{(-j(k_x x + \omega t))}$$

The solution at a generic depth z for a component ($k_x$, ω) is given by:

$$P(k_x, z, \omega) = P(k_x, 0, \omega) e^{j k_z z}$$

where:

$$k_z = \frac{\omega}{c} \sqrt{1 - \left(\frac{c k_x}{\omega}\right)^2}$$

The final pressure field at depth z is given by the inverse 2D Fourier transform:

$$p(x, z, t) = \sum_{k_x} \sum_\omega P(k_x, z, \omega) e^{(j\omega t)} e^{(jk_x x)}$$

According to the above, the elements of the back-propagation matrix 212 for a depth z are given by $e^{j k_z^* z}$ where $k_z = f(k_x, \omega)$.

According to an embodiment, the image reconstruction step for each depth z from the backpropagated and inversely Fourier transformed data comprises the step of considering the signal in the range of times corresponding to the depth range z representative of the scatterer intensity at the location defined by the coordinate (x, z) for the said depth range z and for each azimuth position X.

Figure 3:
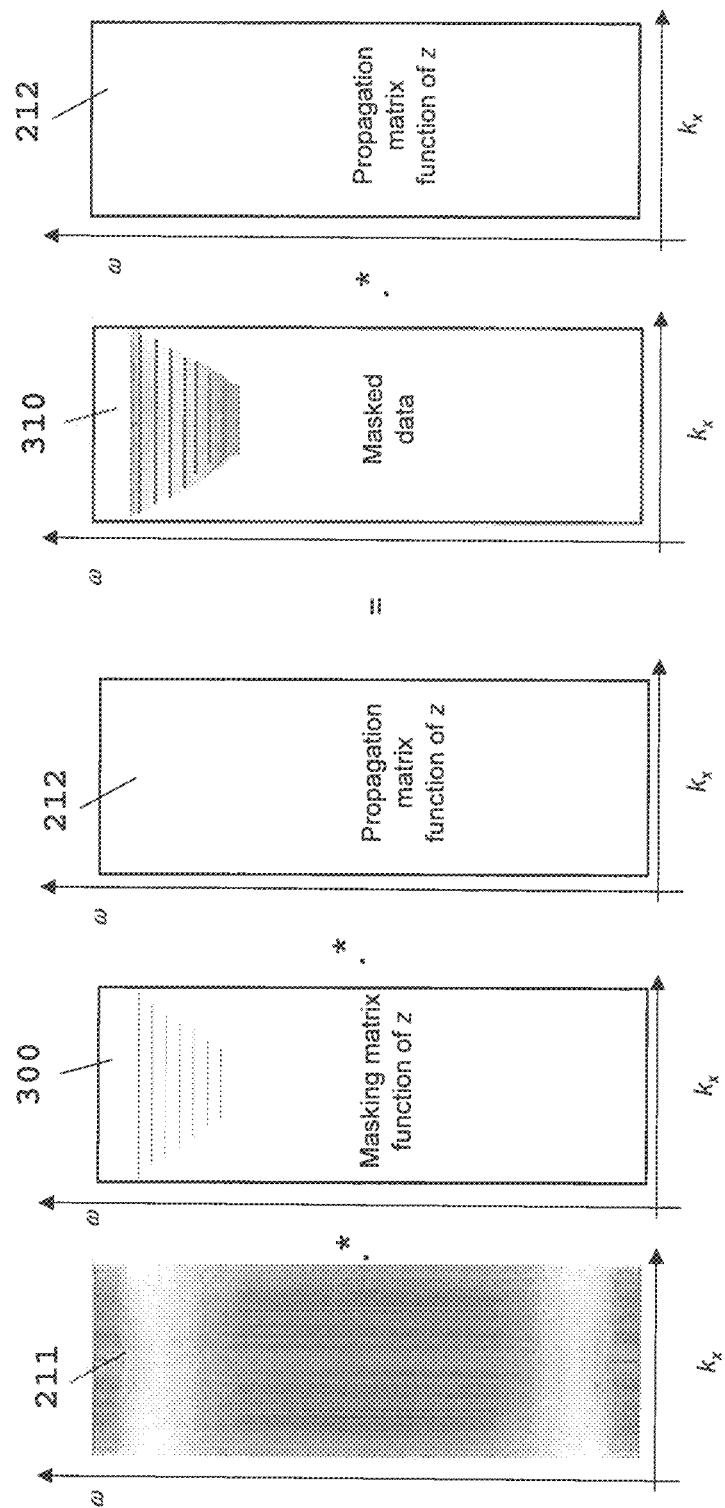
FIG. 3 is a diagram of a method according to embodiments herein.

FIG. 3 is a diagram showing similarly to FIG. 2 the method according to an embodiment. In this case the steps shown by the matrices are the steps of the back-propagation processing which is the one indicated by 210 in FIG. 2 and which must be iteratively repeated for each depth z. In order to have a better relation to the generic backpropagation process of the state of the art, identical matrices to the ones shown in FIG. 2 are indicated by the same numeral also in FIG. 3.

Seismic migration does not take into account per se the deviations from ideal theoretical conditions: finite probe aperture, single element directivity, additive electronic noise, frequency dependent tissue absorption. Such issues are tackled in DAS at the cost of increased algorithm complexity (VFC filters, dynamic aperture etc.) and often in an empirical way.

According to an embodiment, the above deviations from theoretical conditions can be easily considered operating in the wavenumber-frequency domain in a back-propagation image reconstruction method such as seismic migration.

According to embodiments herein and as it will appear with more detail in the following description, the above listed deviations may be represented by a masking matrix which is pointwise multiplied with the radiofrequency signals transformed in the frequency-wavenumber domain.

In FIG. 3 the matrix 211 of the radiofrequency signals transformed in the frequency-wavenumber domain is pointwise multiplied with the masking matrix 300 before being point-wise multiplied with the propagation matrix 212. With 310 there is represented the effect of the masking matrix on the elements of the matrix of the Fourier transformed radiofrequency received signals. The lines in the masking matrix 300, are regions of the masking matrix in which the elements of the matrix are different from 0. In the other regions the matrix elements are all zero, so that after the pointwise multiplication only the elements of the matrix of the Fourier transformed radiofrequency received signals coinciding with the regions of the masking matrix in which non zero elements are present is maintained while all the other elements of the of the matrix of the Fourier transformed radiofrequency received signals are deleted as it is graphically represented at 310. The step of applying an inverse 2D Discrete Fourier to the masked and backpropagated data applies the corrections to the backscattered received signals in the space time domain and which are needed for taking into account one or more or all of the above mentioned deviations as for example finite probe aperture, single element directivity, additive electronic noise, frequency dependent tissue absorption without requiring the increased algorithm complexity caused by VFC filters, dynamic aperture and other arrangements applied when using a Delay and Sum method.

As it will appear more clearly from the following description, the deviations to the ideal conditions may be in some cases depth dependent or may not.

In any case since the image reconstruction method provides of iteratively repeating the seismic migration algorithm for each depth z, a depth dependency of the masking matrices can be considered without introducing variants to the method.

The method applying the corrections for taking into account deviations from the ideal conditions for carrying out the seismic migration or other back-propagation processing by means of masking matrices on the receive signals transformed in the frequency-wavenumber domain provides for several advantages as increasing signal to noise ratio (SNR) of reconstructed image by supressing or enhancing acquired data in proper regions of frequency-wavenumber domain; increasing dynamic range, resolution and penetration.

A further advantage consists in the fact that masking matrices can be precomputed and pre-multiplied offline to the Back-propagation matrices: computational load of seismic migration or other back-propagation algorithms is decreased since zero entries of masking matrices allow to discard the corresponding data entries.

As it will appear also from the following description, the method according to embodiments herein provides advantages relatively to the delay and sum method also for what concerns the computational load and the hardware architecture. Advantages over standard delay and sum are:

No need of expensive HW for oversampling: fine delays computed exactly as phase rotations in frequency;

The method is suited for software implementations via a processor like GPU, DSP etc: based on point wise matrix multiplications and DFTs and easily parallelizable;

Easy tuning of propagation velocity: possibility to deal with aberrations (velocity variation across different layers of tissue)

In the following the methods for determining the masking matrix for considering some of the more relevant deviations are described.

Figure 4:
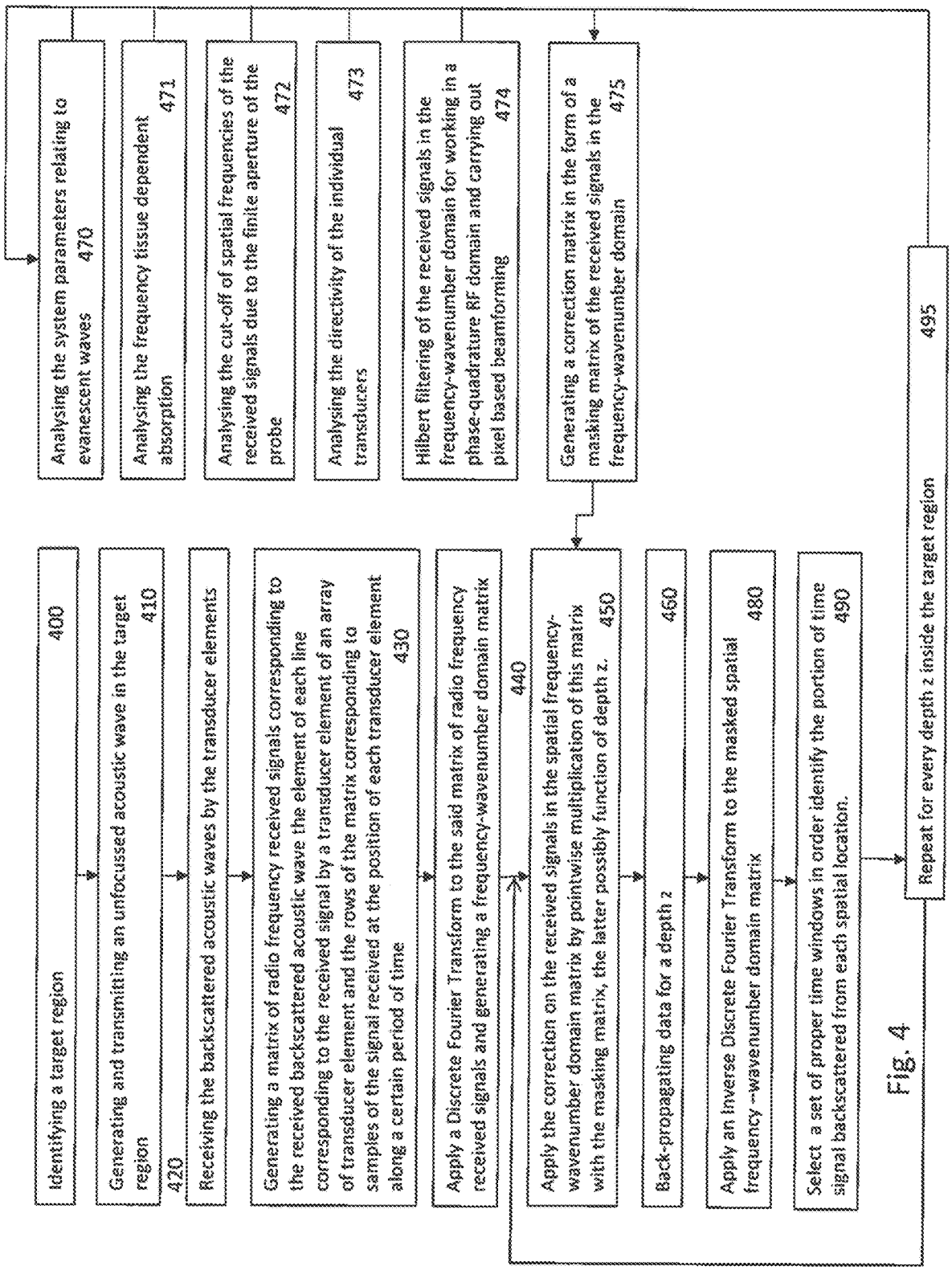
FIG. 4 is a flux diagram of an another embodiment.

The flux diagram of FIG. 4 shows the operations of an embodiment. At step 400 a target region is identified by the processor. At 410, an unfocussed acoustic wave is generated and transmitted in the target region. The backscattered acoustic waves are received at 420. At 430 the matrix of receive electric signal samples sampled by the transducer elements is generated for example according to the previous description in relation to FIG. 1. At 440, the radiofrequency receive signal samples are submitted to a 2D Discrete Fourier Transform.

At 450, the processor applies a correction on the transformed radiofrequency data by point-wise multiplication with a masking matrix. The masking matrix has been computed off line at operations 470, 471, 472, 473, 475. Each of the above operations regards a different condition deviating from the ideal condition and requiring to be considered in the back-propagation processing. The above effect can be considered separately or in any combination and sub-combination and in the embodiment of FIG. 4, four different deviating aspects are considered and analysed in order to provide for a corresponding masking matrix:

Analysing the system parameters relating to evanescent waves at 470;

Analysing the frequency dependent tissue absorption at 471;

Analysing the cut-off of frequencies of the received signals due to the finite aperture of the probe at 472;

Analysing the directivity of the individual transducers at step 473.

Furthermore, at 474, Hilbert filtering is also considered for allowing to work in a phase-quadrature domain and apply pixel based beamforming.

Finally, a masking matrix is generated at 475 and at 450 the Fourier transformed radiofrequency receive signals are multiplied with the masking matrix generated at 475.

For a certain depth z the back-propagation function is calculated generating the backpropagation matrix and, at 480, the Inverse Discrete Fourier Transform is applied to the back propagated data in the frequency-wavenumber domain. At 490, it is detected if there are further depth z for which an image has to be reconstructed by selecting a set of proper time windows in order identify the portion of time signal backscattered from each spatial location and if affirmative the loops 450 to 495 is repeated as well as the generation of a new masking matrix at 475 if any of the deviation effects at 470 to 474 is dependent from the depth z.

In the following embodiments for determining the masking matrix for considering some of the more relevant deviations are described.

Example I

Deleting the Contributions of Evanescent Waves from the k-Space

Evanescent waves in the k-space are defined as follows: all the components in the $k_z$–$\omega$ space for which $$\frac{\omega^2}{c^2} - k_x^2 < 0$$

correspond to evanescent waves that do not propagate. Consequently, they have to be eliminated setting to zero all the points of the matrix of Fourier transformed radiofrequency received signals for which the above condition is true. The elimination of the elements corresponding to the evanescent waves according to the above definition speeds up the calculations of the algorithm of the seismic migration in the transformed space.

According to a further improvement, instead of masking by a step filter having 0 values for the elements of the masking matrix corresponding to the regions of the data matrix to be masked and 1 for the elements of the masking matrix corresponding to the regions of the data matrix which elements has to be maintained, a smooth transition can be applied at the boundary between the zone to be masked and the zones to be maintained by giving to the elements of the masking matrix along the boundary between the said zones and at least on the side of the elements to be maintained a value different from 1. An embodiment provides that for the said elements along the boundary between zone to be masked and zone to be maintained a value bigger than 0 and lower than 1 is set.

The smoothing may be applied only for the elements of the masking matrix in the region to be maintained and along the boundary or also for the elements of the masking matrix in the region to be masked and along the boundary.

The width of the smoothed region may comprise only of one element adjacent to the boundary between region to be masked and region to be maintained or also elements having a greater distance from the said boundary. In a variant embodiment, in this case the values of the elements having a greater distance from the boundary should be less than the value of the elements nearer to the boundary and the variation as a function of distance may be set according any kind of function.

Figure 5:
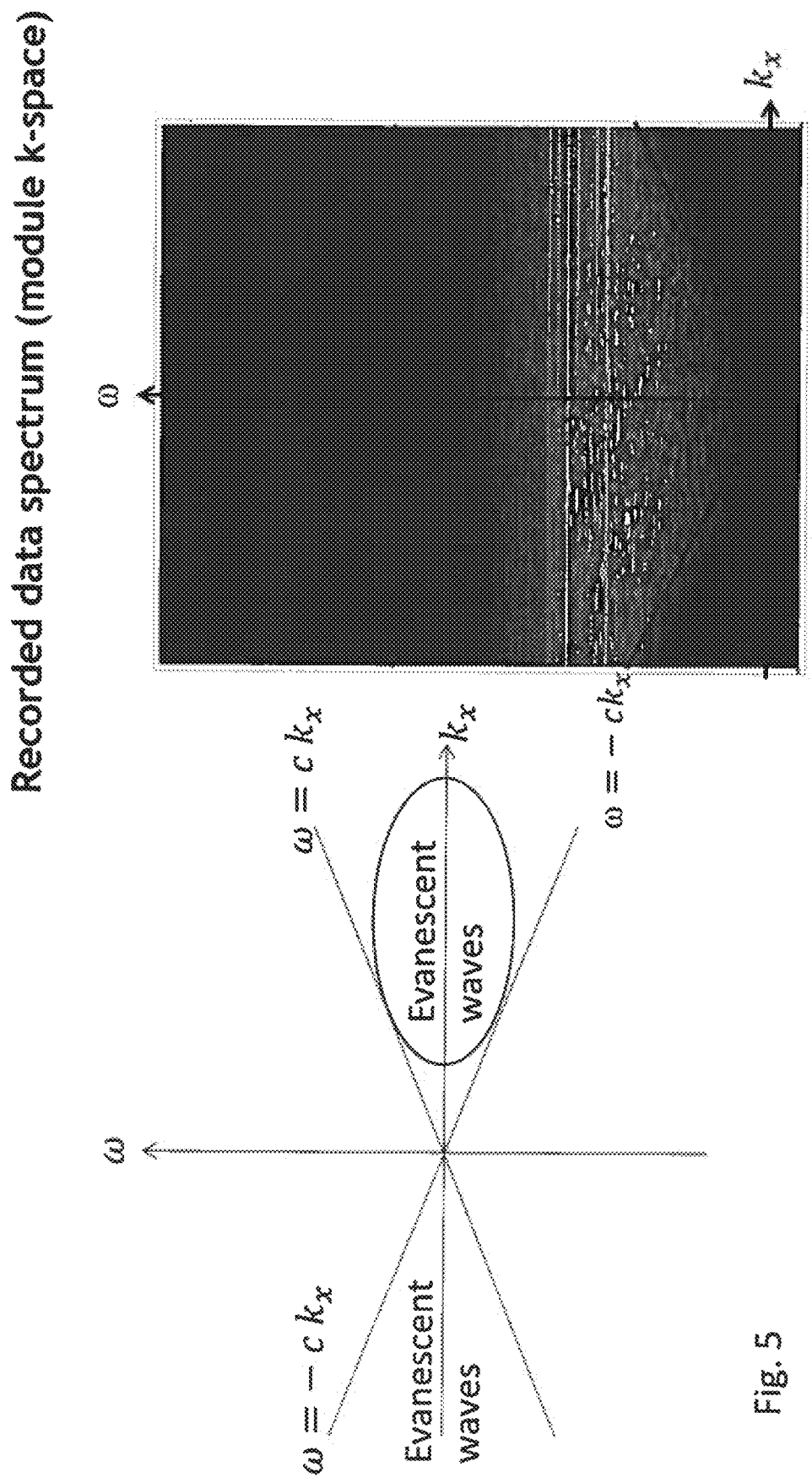
FIG. 5 is a graphical representation of the masking matrix for eliminating evanescent waves.

FIG. 5 shows on the left hand a diagram of the frequency-wavenumber domain in which the boundaries are shown between the regions of this space for which the definition of evanescent waves apply and for which this relation is not true. On the right has of FIG. 5 an example of a recorded data spectrum in the k-space is shown representing the data which does not contribute to the evanescent waves and which is not masked away by multiplication with the masking matrix.

According to an embodiment, the masking matrix will show elements having all a value 1 outside the regions delimited by the two crossing lines and comprising the components of the data matrix for which the evanescent waves definition apply as shown in the diagram on the left of FIG. 5, while all the elements of the masking matrix between the two lines and for which the definition of evanescent waves apply have value 0. The simple mathematical point-wise multiplication of the masking matrix with the matrix of the Fourier Transformed radiofrequency received signal samples delete the components in the matrix of the Fourier Transformed radiofrequency received signal samples responsible for generating evanescent waves.

Figure 6:
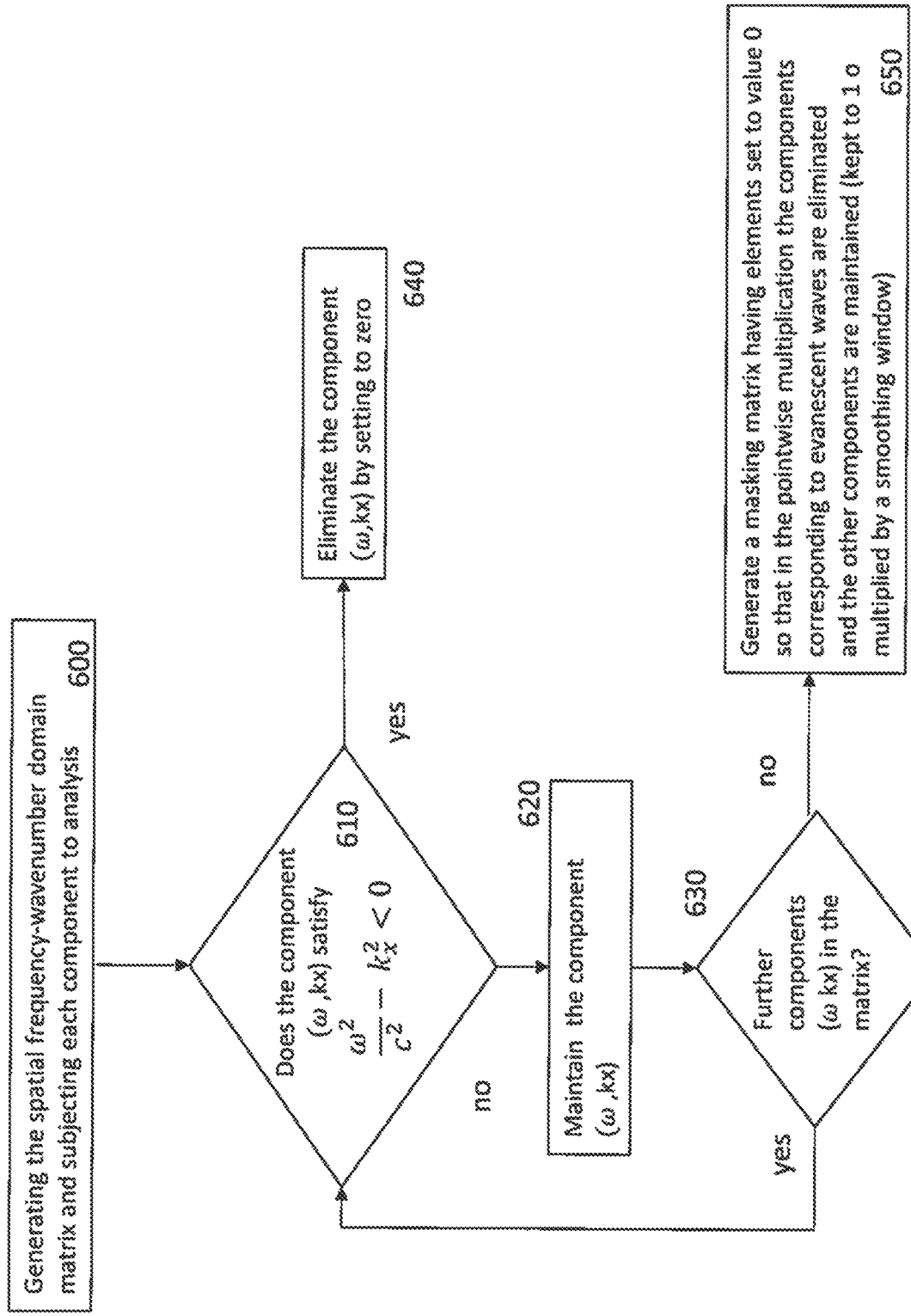
FIG. 6 is a flux diagram of the method for determining the masking matrix for evanescent waves.

An embodiment of the method for calculating the masking matrix for eliminating evanescent waves is illustrated by the flux diagram of FIG. 6. At step 600 the frequency-wavenumber domain matrix of the received radiofrequency signals is generated by a Discrete Fourier Transform and the component of this matrix are subjected to analysis. The analysis comprises the step of calculating if a component ($\omega$,kx) satisfies the condition according to the definition of evanescent wave as indicated at step 610. If the condition is met than the corresponding component ($\omega$,kx) has to be eliminated at 640 and the masking matrix is generated with an element of value zero at the position corresponding to the position of the component of the of frequency and wavenumber domain matrix which has to be eliminated. If the step 610 shows that the definition of the evanescent wave is not met steps 620 is carried out considering the said component ($\omega$,kx) of the matrix to be maintained and the masking matrix element corresponding in position to the one of the component to be maintained is given a value different from zero such as 1. As an further variant the component along the boundary between the zones in which components have value zero and the zones in which the components have values 1 may be multiplied by a smoothing factor for the components having values 1 or increased relatively to 0 for the components having value 0. The process is repeated till there are elements in the matrix as determined at step 630. When all the elements of the matrix of the received signals transformed in the frequency-wavenumber domain are analysed the masking matrix is generated as indicated at step 650.

Example 2

Taking into Account the Distortion of the Spectrum of Received Signals Due to Frequency-Dependent Tissue Absorption The attenuation in the tissues is proportional to the frequency, typically 0.5 dB/cm/MHz. As a result, the spectrum of the received signals will tend to decrease in bandwidth and move towards a lower central frequency as far as the scatterers depth z increases. As a consequence, the useful signal band, where signal to noise ratio (SNR) is acceptable, will change accordingly. In order to keep the overall SNR sufficiently high, in standard delay-and-sum beamforming, variable pass band filters are applied to RF signals. Since the filters parameters vary with depth, this operation is computationally expensive. In seismic migration, such filters can be replaced by masking of the proper range of m, according to the current depth z.

Figure 7:
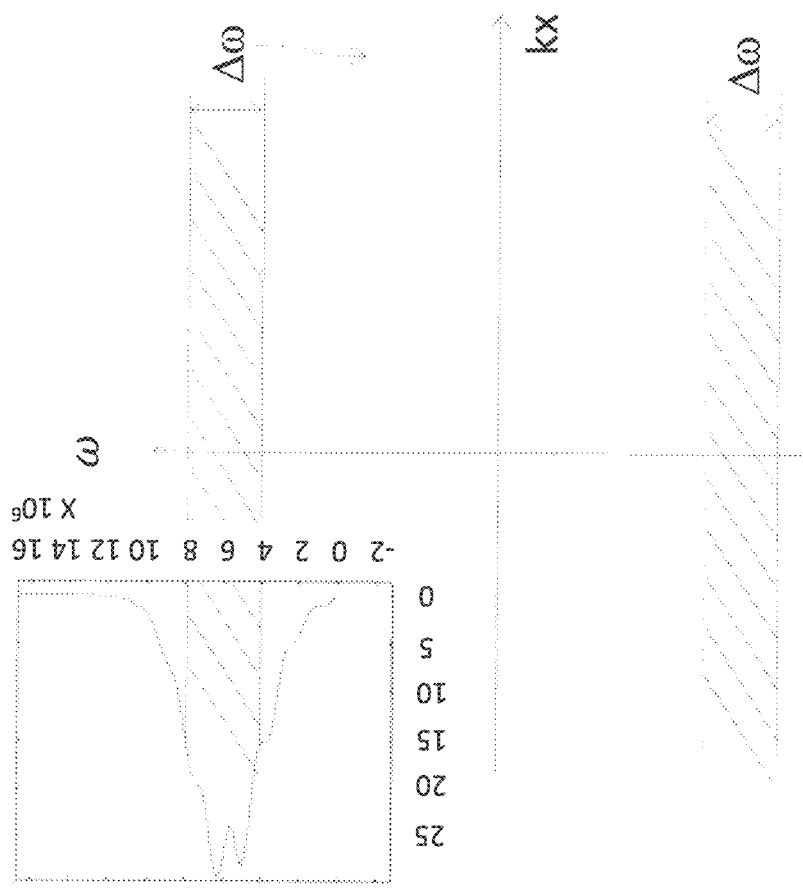
FIG. 7 is a graphical representation of the masking matrix for considering the frequency dependent tissue absorption.

FIG. 7 shows the graphic representation of the masking matrix for a given depth z which allows to consider the distortion of the spectrum of the received signals due to a frequency-dependent tissue absorption. This deviation from ideal conditions is dependent on the depth z and the matrix will change for each different depth. In the K-space the matrix structure comprises two regions corresponding to a certain frequency range $\Delta\omega$. The mask represented by the shadowed region is given by ones in the rectangle corresponding to the band with intensity above a certain threshold, and zeros outside. The shadowed bands or rectangles in the FIG. 7, shrink and move toward the kx axis with increasing the depth z.

The above structure of the masking matrix for this case is defined by the following equation:

$$\text{mask}(\omega) = \prod \left( \frac{\omega - (\omega_{start} - \alpha z)}{\text{scale} - \beta z} \right) \text{ for } \omega > 0$$

Where:
mask($\omega$) are the values of $\omega$ in the k space to be masked;
z is the depth;
$\alpha$ and $\beta$ are coefficients.

Figure 8:
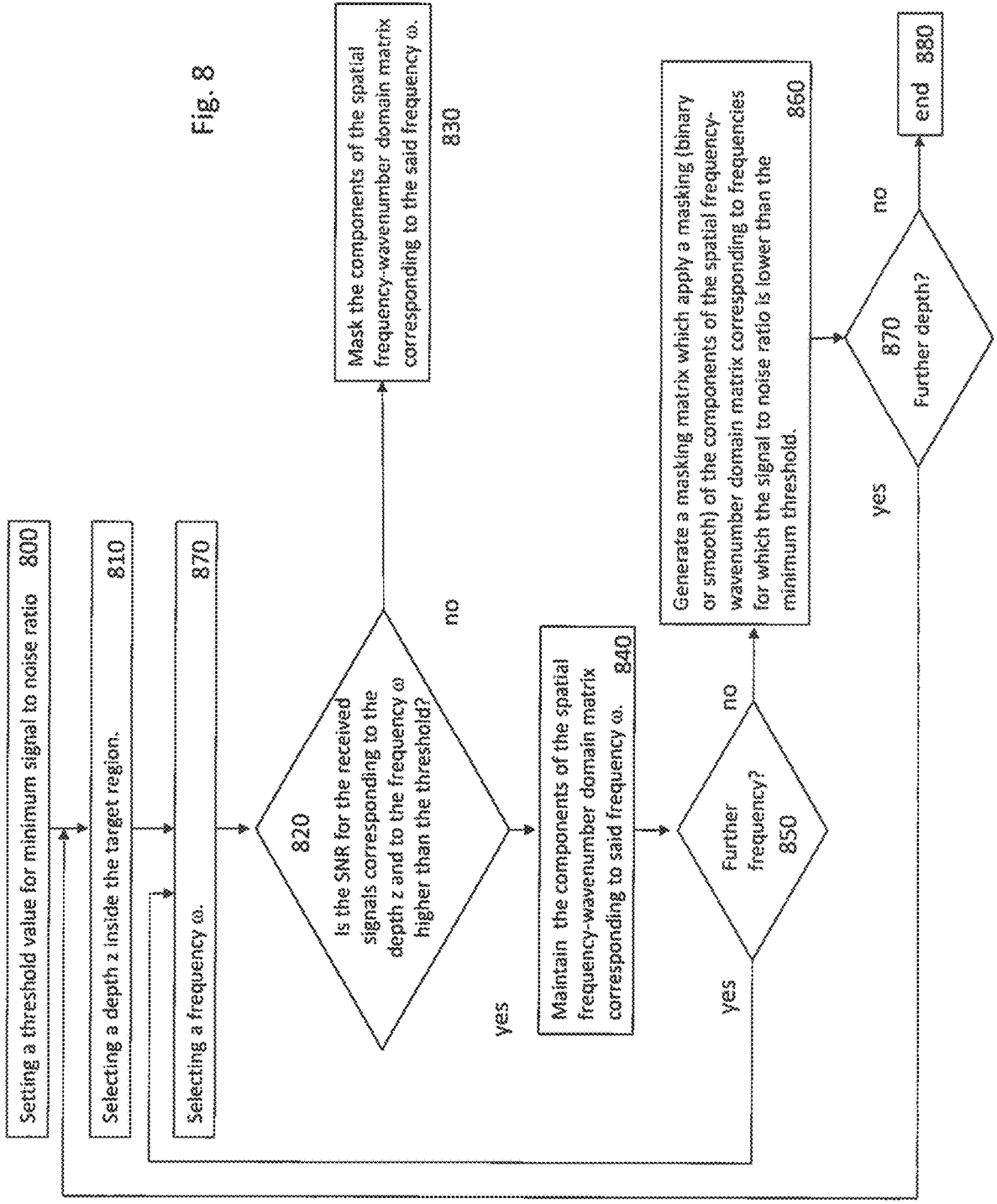
FIG. 8 is a flux diagram of the method for determining the masking matrix for the frequency dependent tissue absorption.

The flux diagram of FIG. 8 describes an embodiment of the method steps for determining the values of the masking matrix for considering the distortion of the spectrum of received signals due to frequency-dependent tissue absorption. The main criterion for determining if an element of the matrix in the k-space is to be masked or not is the signal to noise ratio. At step 800 a threshold value for the minimum acceptable signal to noise ratio is set. At step 810 a depth z is selected. At step 870 a frequency ω is selected.

At step 820 the signal to noise ratio of the components of the matrix of the sampled radiofrequency receive signals in the frequency-wavenumber domain corresponding to the depth z and to the frequency ω is determined and is compared with the threshold set for a frequency range. If the signal to noise ratio is below the threshold, then at step 830 it is masked by giving value 0 to the elements of the masking matrix corresponding in position to the elements of the data matrix to be masked corresponding to the frequency ω. If the signal to noise ratio is above the threshold the said components are to be maintained at 840 and the element corresponding to the chosen frequency ω is maintained by setting the corresponding element in the masking matrix to the value 1. At step 850 it is verified if the above cycle has to be repeated for further frequencies. If yes the cycle is repeated. On the contrary at step 860 the masking matrix is constructed according to the values for the elements determined at the previous steps 820, 830, 840 for the selected depth z. If a masking matrix has to generated for a further depth z step 870 provides for repeating the cycle returning to step 810 for selecting a new depth and repeating the steps for constructing a masking matrix for the new depth z. If no further depths has to be processed the process ends at 880.

It has to be noted that the binary masking of the above embodiment in which only values 0 or 1 are given to the elements of the masking matrix is the simplest case, resulting in a reduction of computational load. If the overall SNR is sufficiently high, masking can be also used to partially compensate the frequency dependent attenuation, by enhancing the upper part of the signal spectrum.

According to a variant embodiment however more complex masking can be devised, which allows smoothing the boundaries of useful band. In this case, instead of giving only values of 0 and 1 in the masking matrix the values 1 can be reduced at values between 1 and 0 by approaching the lines defining the boundaries between regions of the matrix to be masked away and region to be maintained. The reduction rate can be set according to a function of the distance of the elements from the boundary lines in the masking matrix Example 3

Take into Account the Depth-Dependent Cut Off of Spatial Frequencies in the Received Signals, Due to the Probe Finite Aperture The finite aperture of the probe implies a limitation of the frequencies depending on the depth of the scatterers. In the k-space, the probe finite aperture implies a cut-off of azimuthal frequencies of the received signals.

Figure 9:
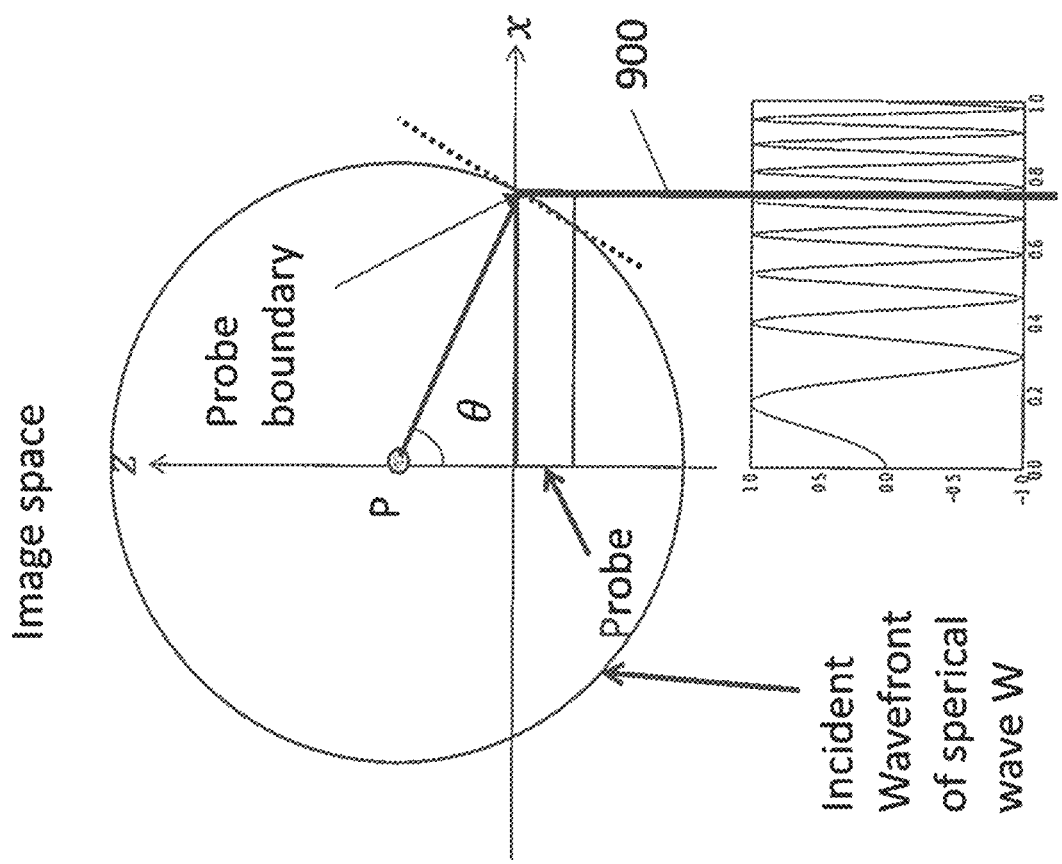
FIGS. 9 and 10 are a graphical representation of the masking matrix for considering the finite aperture of the probe.
Figure 10:
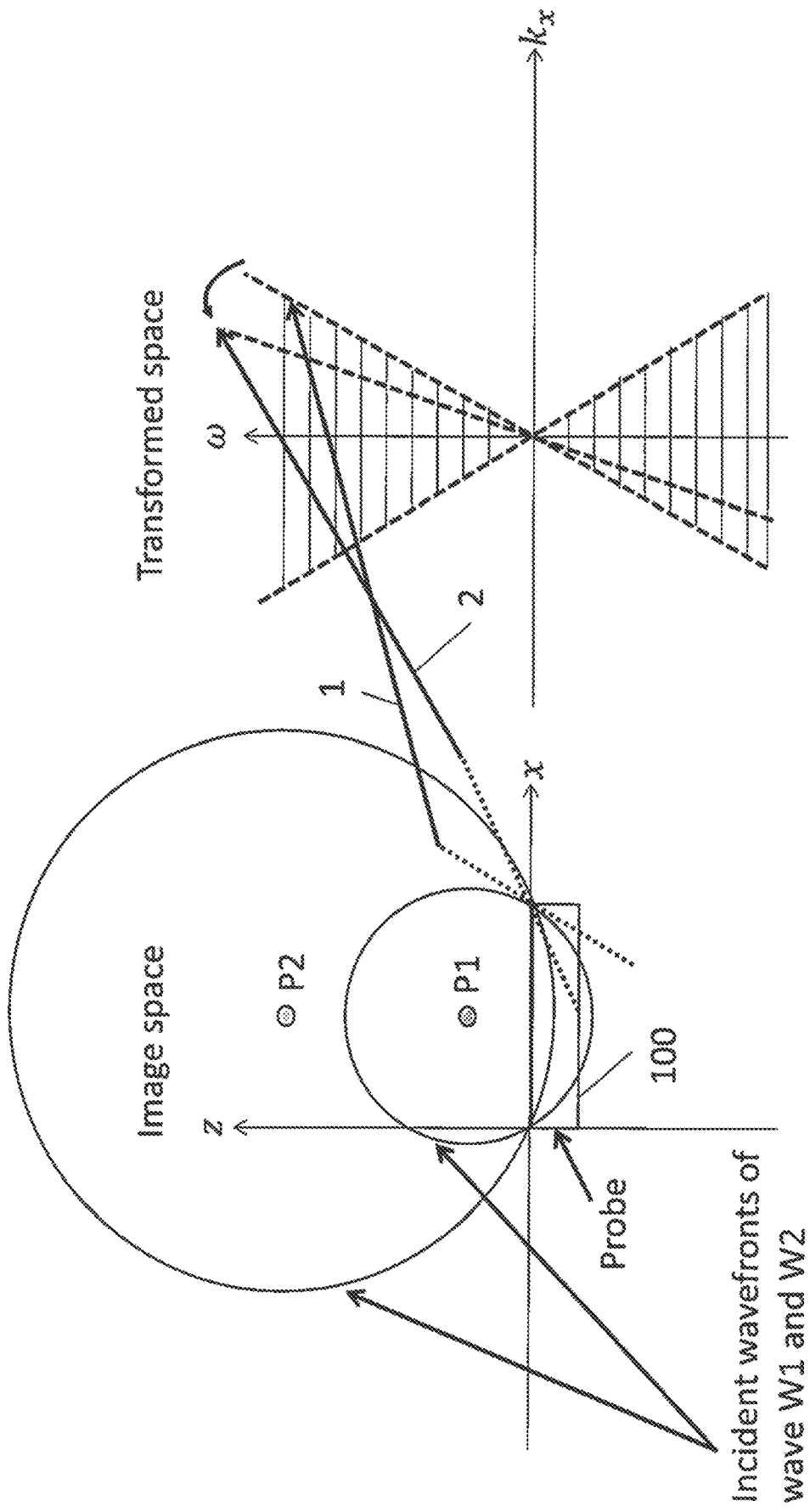

As illustrated in FIGS. 9 and 10 consider a point P like scatterer emitting a spherical wave impinging on the probe surface. The "local" frequency sampled by the transducers of the probe 1 will depend from the local angle of incidence of the spherical wave W with respect to the probe plane. Since the maximum angle occurs at the probe boundaries, the probe size sets a limit to the frequency content that can be acquired. Increasing the scatterer depth the wave front impinging on the probe becomes flatter and the maximum angle decreases, decreases the maximum frequency as well.

In FIG. 9 the above condition is represented in the space-time domain the wave front of the incident spherical wave at the probe boundary is shown and the cutoff is represented by a vertical line 900.

In FIG. 10 the same situation is shown referring to the k-space. A given angle of incidence is mapped to a line crossing the origin in the ($k_x$, ω) space, whose slope tends toward the c axis as far as the angle decreases. This fact allows to define a region of validity with a shape of a double triangle where the SNR is acceptable. Increasing the depth z of the scatterers, the triangle area, corresponding to the masking equal to 1, is decreased as well in the transformed space as shown in FIG. 10. This is represented in FIG. 10 by showing two points P1 and P2 emitting a spherical wave W1 and W2 of which the wave front at the boundary of the probe 100 is shown. The arrows 1 and 2 indicates the boundary lines between areas of the masking matrix corresponding to elements to be masked or to be maintained in the matrix of Fourier transformed radiofrequency receive signals.

An embodiment, provides a binary masking of these regions according to the one described in the previous example.

In a variant embodiment, there is provided for a smoothing of the boundaries to avoid ringing effects in the original domain as described in the previous example.

Figure 11:
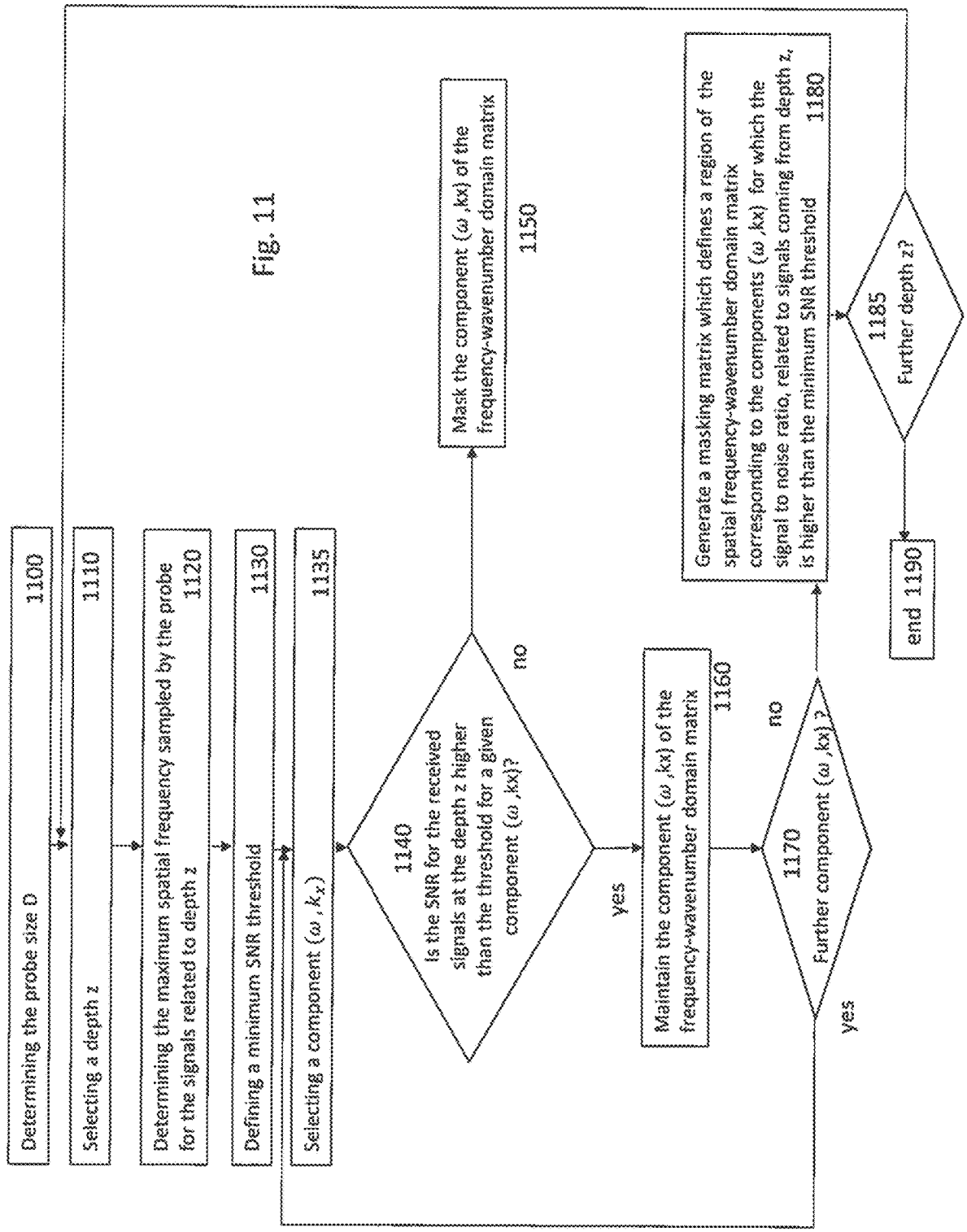
FIG. 11 is a flux diagram of the method for determining the masking matrix for considering the finite aperture of the probe.

An embodiment of the method for determining the masking matrix for considering the frequency cut-off due to finite dimensions of the probe is described by the flux diagram of FIG. 11. As a first step 1100 the size D of the probe is determined. At step 1110 a depth z is selected At step 1120 the maximum frequency sampled by the probe is determined for the signals related to the depth z. And at step 1130 a minimum threshold value for the signal to noise ratio is set. At step 1135 a component (ω, $k_x$) of the data matrix is selected. At step 1140 the comparison is made if the signal to noise ratio for the Fourier transformed received signal samples in the spatial frequency-wavenumber domain at the depth z and for the component (ω, $k_x$) is higher than the threshold for a frequency. If the result is that the signal to noise ratio is lower than the threshold, than the corresponding element of the masking matrix is set to a value zero for masking away the element in the space frequency-wavenumber domain matrix corresponding to the component (ω, $k_x$) of the samples of Fourier transformed receive signals at step 1150. If the signal to noise ratio is higher than the threshold, as indicated at step 1160 the component (ω, $k_x$) of the frequency-wavenumber domain matrix is maintained setting a value higher than zero for the corresponding element in the masking matrix.

At step 1170 it is verified if the cycle has to be repeated for further components (ω, $k_x$) and if affirmative the steps 1135 to 1150 and 160 are repeated. If the result is negative, step 1180 is carried out for generating the masking matrix which defines a region of the spatial frequency-wavenumber domain matrix corresponding to the components (ω, $k_x$) for which the signal to noise ratio, related to signals coming from depth z, is higher than the minimum SNR threshold.

At step 1185 it is verified if the cycle has to be repeated for further depths z and if affirmative the cycle is repeated returning at step 1110 and repeating the cycle of steps 1120 to 1180 for generating the masking matrix for a further depth z. If no further depth z is to be considered, than the process is ended at step 1190.

Also in this case an embodiment may provide binary masking by giving to the elements of the masking matrix either the value 0 or the value 1 as described above in relation to example 2.

A further variant embodiment may provide smoothing for example applying a method as disclosed above in relation to example 1 and 2.

Example 4

Coping with the Directivity of the Individual Transducers

Figure 12:
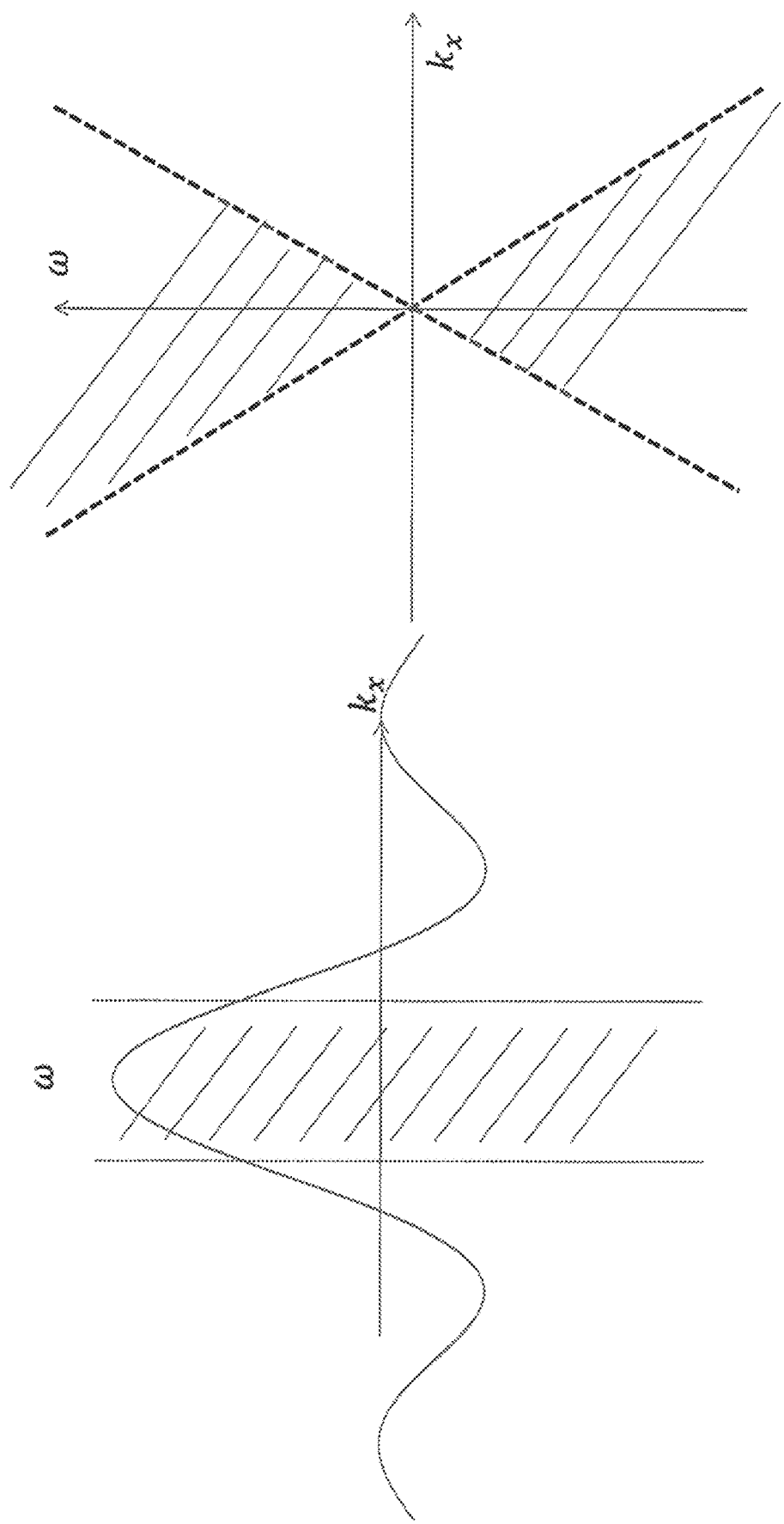
FIG. 12 is a graphical representation of the masking matrix for considering the directivity of individual transducer elements.

The effect of single element directivity in ($\omega$, $k_x$) space is two fold:

A first term sinc($dk_x$), where d is the width of a single transducer element of the probe, is frequency independent and induces a reduction of the frequency components available for reconstruction, since, increasing the frequencies index $k_x$, the lower values of the sinc multiplied to the signal decrease the SNR value below acceptable levels. To keep high the overall SNR a binary mask can be applied, with ones in the region verifying sinc($dk_x$)>thr, where thr is a threshold set on the base of the SNR, and 0 outside that region. An example of such a sine function is shown in the diagram of the left side of FIG. 12. The sine function is multiplied across the $k_x$ axis. In one embodiment which correspond to the simplest case, the masking matrix is designed for binary masking, the elements having a value equal to 1 in the region of the sync function above a certain threshold and a zero value elsewhere.

The second term is analogous to the term considered for the effect of finite probe size except that there is no dependency from depth z. In particular, if an hard thresholding criterion is selected a linear boundary can be derived in the $\omega$, $k_x$ space imposing:

$$\sqrt{\frac{\frac{\omega^2}{c^2} - k_x^2}{\frac{\omega^2}{c^2}}} > thr$$

leading to $$|k_x| < \frac{\omega}{c}\sqrt{1 - thr^2}$$

Where $\omega$, $k_x$ are respectively the frequency and the frequency index or wavenumber;
c is the speed of sound;
In the right part of FIG. 12 an example of the masking matrix generated for taking into account the second term is shown. As it appears from the diagram a masking matrix analogous to the one of the embodiment related to example 3 is obtained for this second term.

According to a variant embodiment, in relation to the first term, if the noise level is not too high (e.g. for shallow depths) the distortion induced by the sinc-function can be partially compensated for, adopting a mask whose entries are the inverse of the sinc-function. For intermediate levels of noise an optimal masking can be derived, e.g. with a least squares solution.

Also in this case the two variant embodiment relating to a binary masking matrix or a smoothed masking matrix as disclosed in relation to example 2 may apply.

Figure 13:
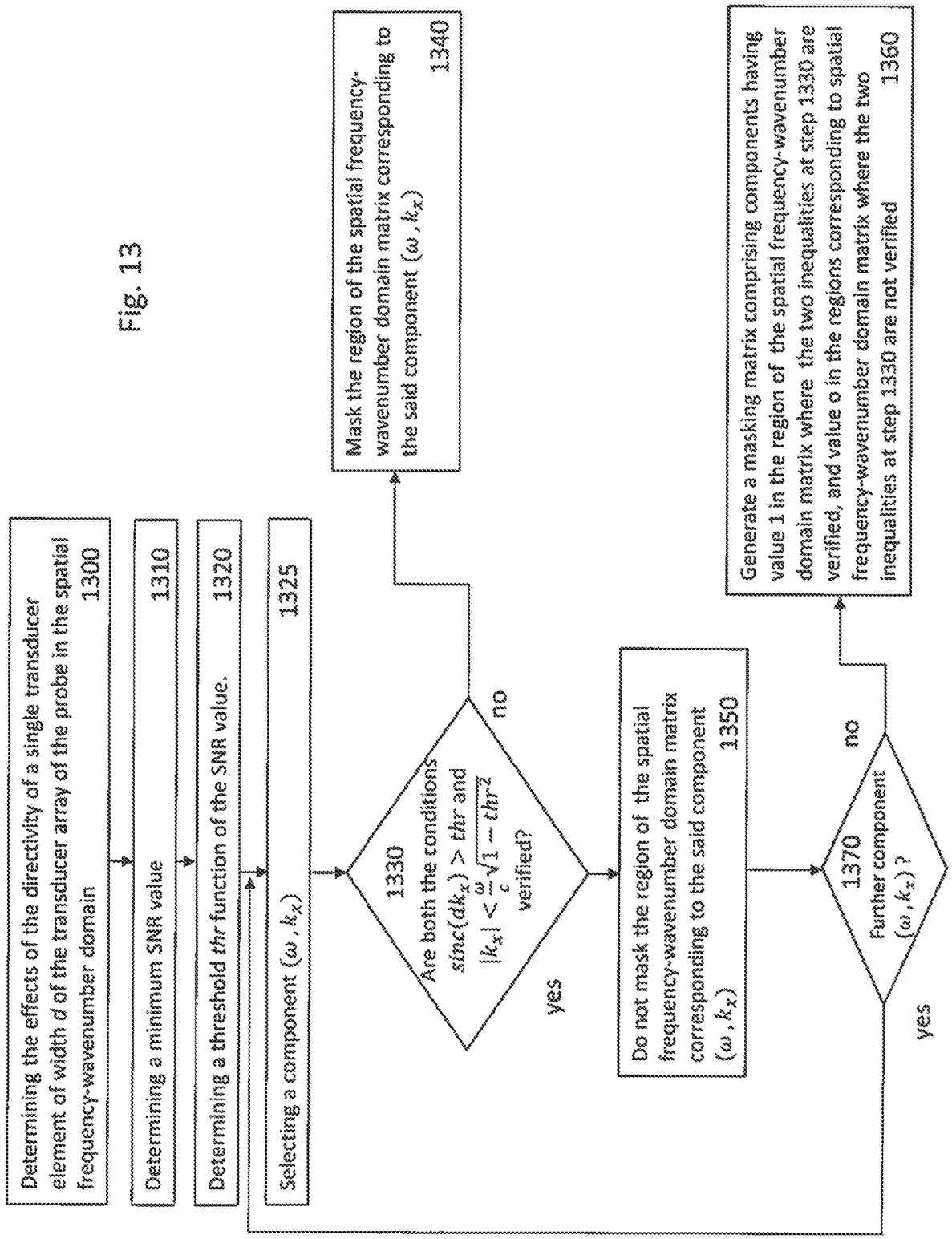
FIG. 13 is a flux diagram of the method for determining the masking matrix for considering the directivity of individual transducer elements.

FIG. 13 is a flux diagram of an embodiment of the method for carrying out the computation of the masking matrix according to example 4. In Step 1330 the determination of the effects of the directivity of a single transducer element of the transducer array of the probe in the frequency-wavenumber domain is carried out. At step 1310 a minimum threshold of the Signal to Noise ratio is set. At step 1320 a threshold thr function of the signal to noise ratio SNR is determined and at step 1325 a component ($\omega$, $k_x$) is selected. At step 1330 two conditions are verified. The first condition is if for the selected ($\omega$, $k_x$) component the equation sinc($dk_x$)>thr is satisfied.

The second condition is if the values of the norm of the frequency index kx satisfies the following equation:

$$|k_x| < \frac{\omega}{c}\sqrt{1 - thr^2}$$

If the result is false for an index kx, the region of the frequency-wavenumber domain matrix corresponding to the said spatial frequencies index kx for the said component ($\omega$, $k_x$) is masked as indicated at step 1340 by setting the value of the masking matrix corresponding to the said region to 0.

If the result of the comparison satisfies the equation then at step 1350, the region of the frequency-wavenumber domain matrix corresponding to the said spatial frequencies index kx for the said component ($\omega$, $k_x$) is not masked by setting the values of the elements of the masking matrix in the said region to 1. At step 1370, it is verified if further components ($\omega$, $k_x$) are to be considered and if the answer is affirmative the cycle of the steps 1325, 1330, 1340, 1350, 1370 is repeated.

If the answer is negative because no further component ($\omega$, $k_x$) is to be chosen, at step 1360 a masking matrix is generated comprising components having value 1 in the region of the spatial frequency-wavenumber domain matrix where the two inequalities at step 1330 are verified, and value 0 in the regions corresponding to spatial frequency-wavenumber domain matrix where the two inequalities at step 1330 are not verified Example 5

Working in a Phase-Quadrature (IQ) RF Domain, and Thus Allowing Pixel Based Beamforming In standard Delay-and-Sum beamforming the beamformed RF signal is typically filtered by an Hilbert filter in order to extract its envelope. From the envelope a subset of samples are visualized as image pixels.

An alternative procedure consists in filtering the received RF signals with an Hilbert filter and perform beamforming with the resulting analytic signals (IQ signals). In this way, the envelope extraction is reduced to a modulus operation, thus allowing to process just the samples necessary for the pixels to be visualized (pixel beamforming) with a relevant computational saving.

Figure 14:
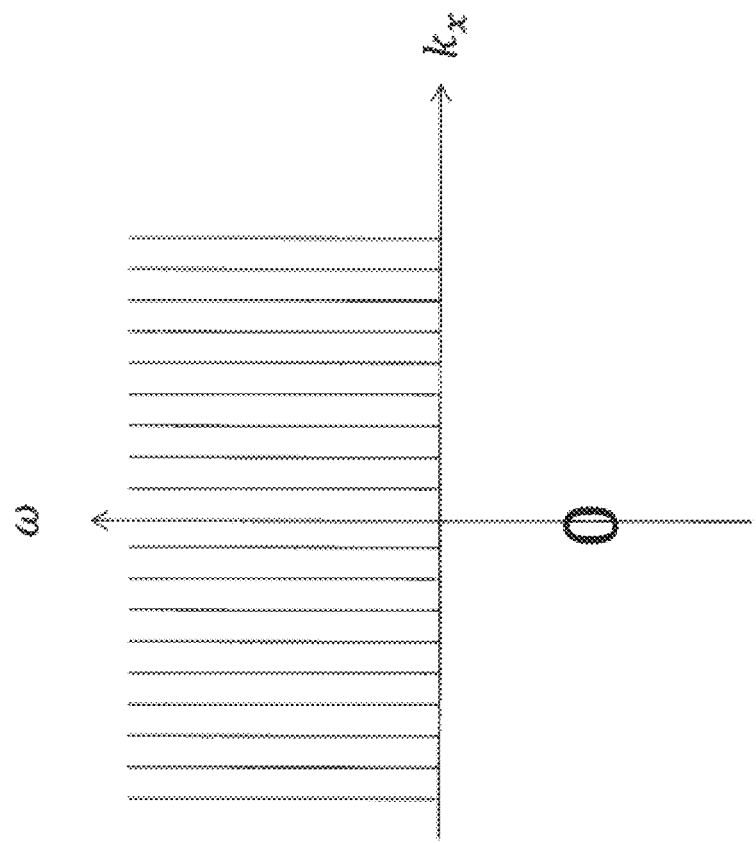
FIG. 14 is a graphical representation of the masking matrix for working in phase and quadrature radiofrequency domain and allowing to operate in combination with pixel based beamforming.

Since the spectrum of the Hilbert filter is a 0-1 step, with zeros on the negative frequencies, it is possible to implement the filtering of RF signals in the ($k_x$, $\omega$) domain, by a simple mask of 1 for $\omega$>0 and 0 for $\omega$<0. This obviously halves the number of entries to be processed and reduces computational load and time. FIG. 14 shows a diagram of an embodiment of a Hilbert filtering implemented as a masking matrix according to embodiments herein.

In relation to the technique of pixel based beamforming, this technique is disclosed in several documents among which document U.S. Pat. No. 8,287,456 and document WO2009/158399 which are to be considered incorporated herein by reference.

An embodiment relates also to a system for carrying out the above method in one or more of the different embodiments and variants described.

One of the advantages of the present image reconstruction method relay in the fact that the ultrasound system is mainly formed by a software program in which the instructions are coded for configuring generic processor hardware and the related peripherals in such a way as to perform the functions required by the method.

The software may be in the form of a code which can be run on an operating system executed by a generic hardware processor in any hardware configuration, such as a conventional PCT, a workstation, a digital signal processor or other equivalent hardware units able to save the program code in a memory and to execute the program. The hardware may need only at least one or more connector interfaces which correspond with the connectors of the ultrasound probes for connecting each channel of the probe to a processing channel of the processing unit.

Figure 15:
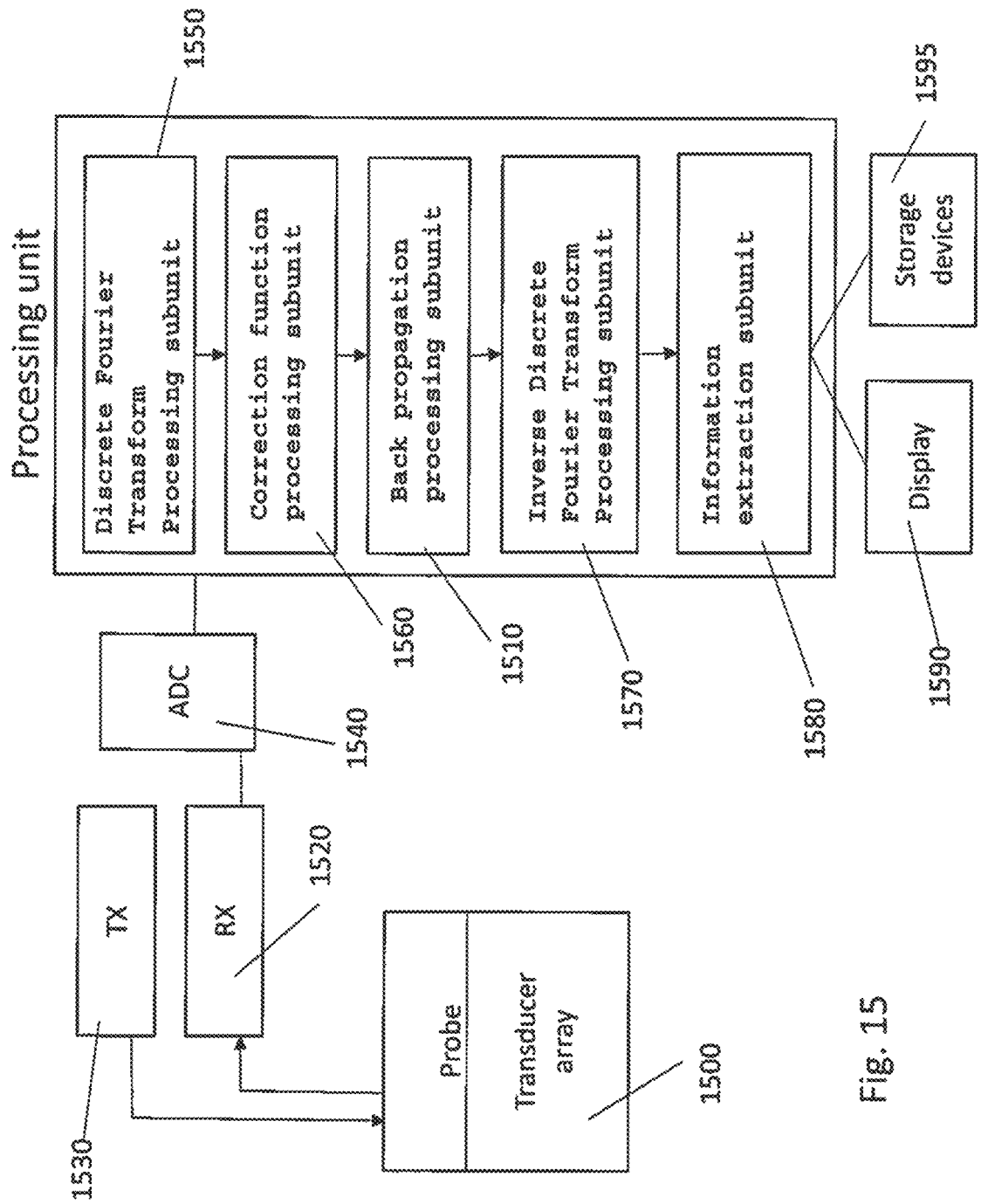
FIG. 15 is a block diagram of a system according to embodiments herein at a first level of generalisation and comprising generic processor hardware which is configured to carry out the method according to embodiments herein.

FIG. 15 shows a diagrammatic representation of such kind of ultrasound system having an architecture of generic hardware processor executing a specific software program for configuring the hardware to carry out functions related to the method according to one or more embodiments herein. With a transducer array 1500 of an ultrasound probe is connected to a transmit wave generating unit 1530 and to an ultrasound acoustic waves receiving unit 1520. The transmit wave generating unit furnishes to the array transducers the electric signals for driving the said transducer elements to emit an ultrasound wave. These driving signals may be sent to each of the transducer elements of the array 1550 with such time delays in order to generate an unfocussed wave by one or more of the transducer elements such as a plane wave, a cylindric wave or a spherical wave. The unfocussed wave is transmitted into a region of interest and the ultrasound backscattered signals are received by the transducer elements and transformed by these in receive electric radiofrequency signals corresponding to the received ultrasound signals. The received signals are transformed in digital signals by an ADC converter 1540 and sampled over time, generating as described in relation to FIG. 1 a matrix of samples of radiofrequency signals which are ordered as a function of the position of the receiving transducer element and over time. This data matrix of samples of radiofrequency signals may be stored in a memory (not illustrated) or may be directly processed by a processing unit.

In an embodiment, this processing unit is a conventional processing hardware comprising peripherals such as at least one memory, a buffer memory, an internal data transmission bus communication interfaces for input and output data to further peripheral which may be internal to the processor or external peripherals such as storage peripherals as hard disks, Optical disks readers and writers, printers, solid state disks like USB, pens or other equivalent storage devices.

According to an embodiment, the processing unit is configured to have different processing sub units such as a Discrete Fourier Transform processing subunit 1550, a Correction function processing subunit 1560 which apply the correction by means of masking matrices as described above, Back propagation processing subunit 1510, an Inverse Discrete Fourier Transform Processing subunit 1570 and an information extraction subunit 1580 which processes the signal components relating to the spatial positions in the target region for extracting information about the scatterers at these positions. Examples of such information extraction may be an image reconstruction for generating an anatomical image of the target region or Doppler data relating to moving scatteres and/or measurement of qualities of the target region at the spatial positions such as for example measurement of the elasticity coefficients. A display 1590 or a memory or other storage devices indicated globally with 1595 are connected to the Information extraction subunit 1580 in order to display print or save the extracted information.

According to an embodiment, the subunits are at least in part only formed by a software program comprising the instructions to the generic processor hardware to carry out the functions of the said at least part of the subunits. In a variant embodiment each of the subunits is formed by a specific software comprising a program coding the instructions to the generic processing unit to carry out the functions of the corresponding subunit.

According to a further variant embodiment the generic hardware processing unit, may comprise more than at least one processor for example more than one CPU or a CPU and a GPU and/or at least one DSP which can be configured each one by the software to execute the functions of one or more of the processing subunits.

As it appears from the above embodiments provide for a fully new architecture of an ultrasound system in which the entire system is formed mainly by a generic processing unit and a specific software comprising software programs coding the instructions for configuring the generic processing hardware to carry out the functions of the ultrasound system.

Figure 16:
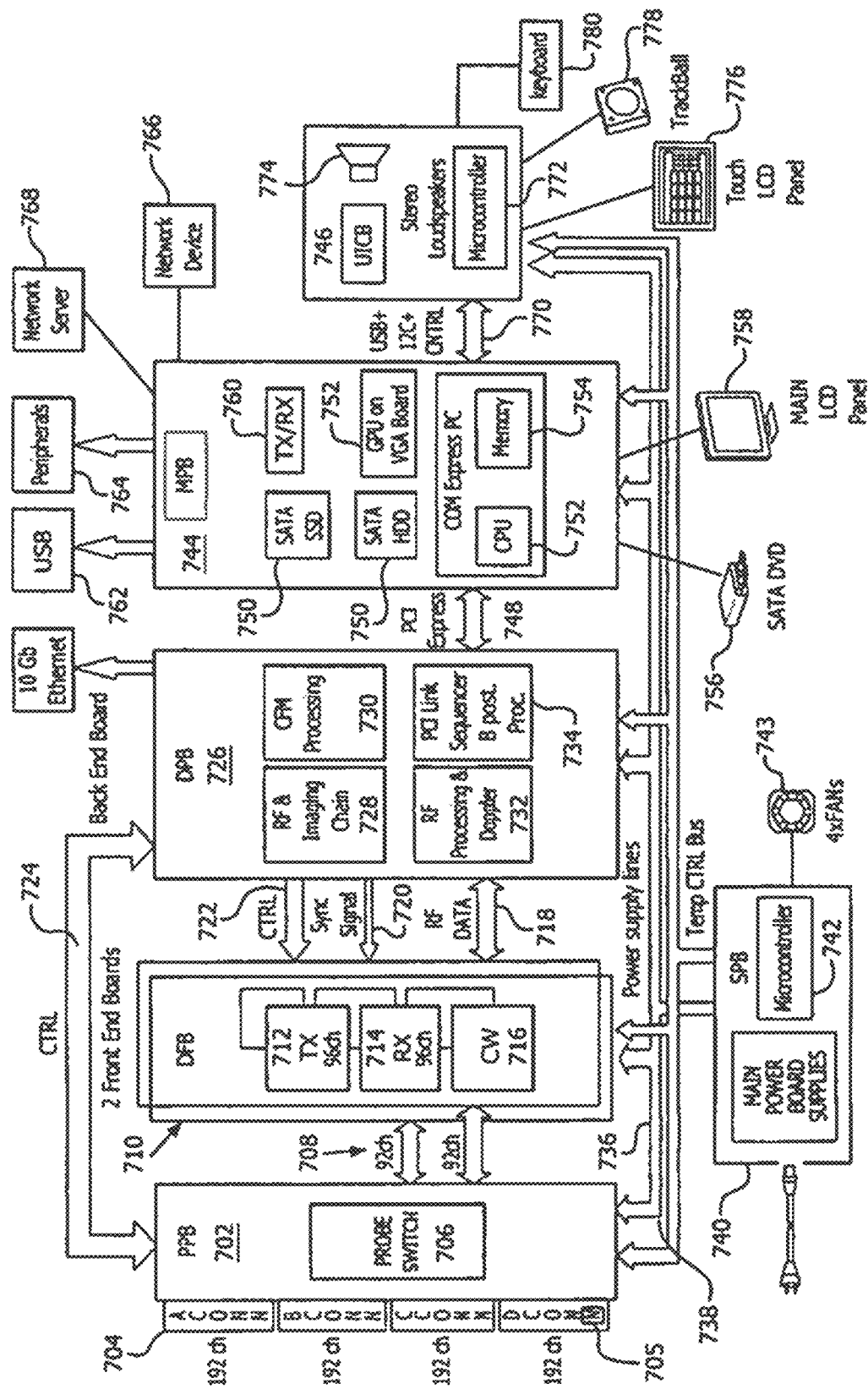
FIG. 16 illustrates a block diagram of an ultrasound system formed in accordance with an alternative embodiment.
Figure 17:
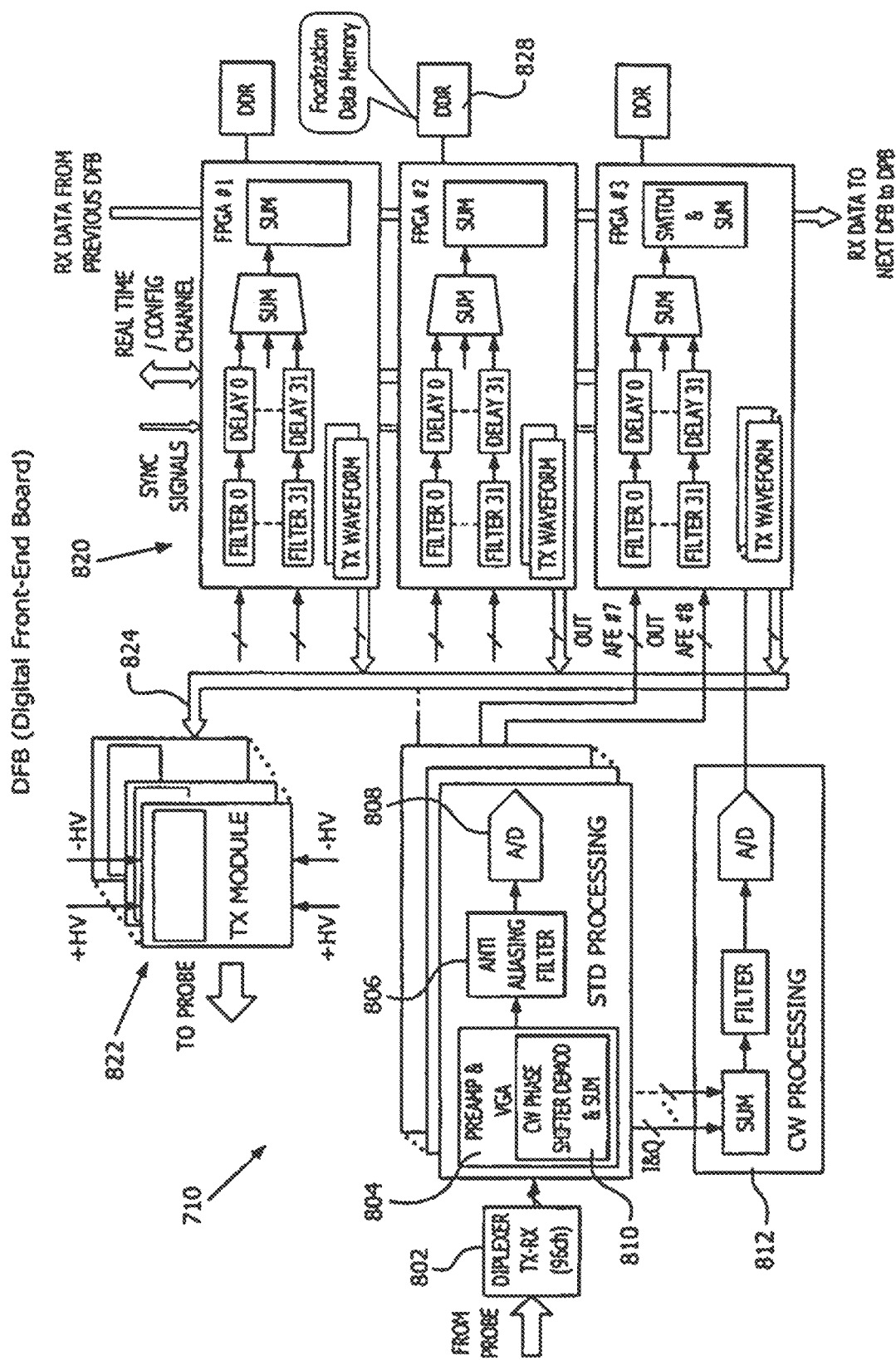
FIG. 17 illustrates a block diagram of a portion of the digital front-end boards.
Figure 18:
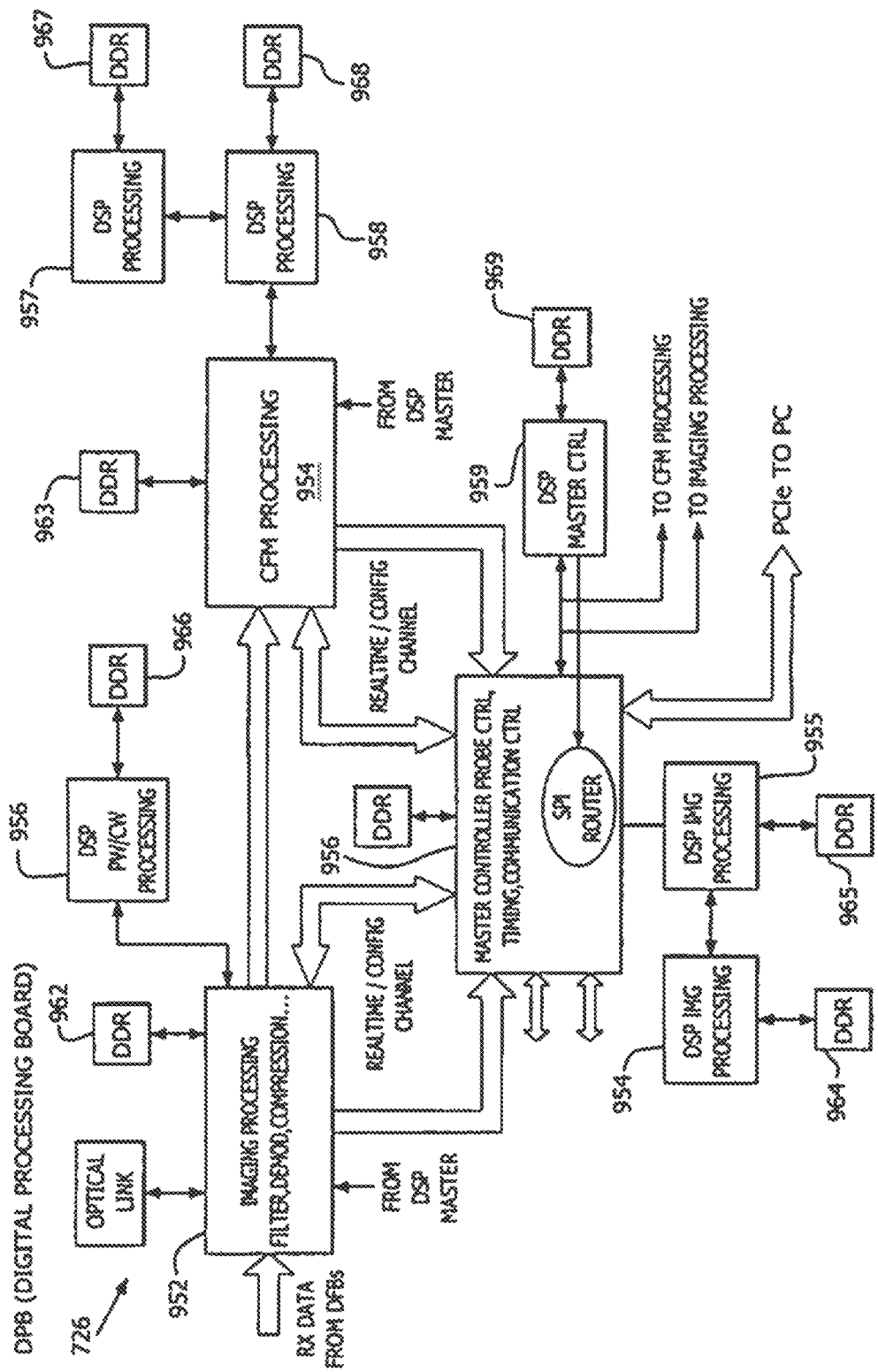
FIG. 18 illustrates a block diagram of the digital processing board.

FIGS. 16 to 18 show a further embodiment comprising a traditional ultrasound system operating according to the Delay and Sum method and having an hardware which comprises processing channels capable of processing each signal of each transducer element and which ultrasound system comprises one or more processing units in the form of a generic processor, a DSP, a GPU or other processor hardware and at least a memory for saving executable program code which configures the system to operate according to the said Delay and Sum imaging method. According to an embodiment, a further program can be saved in the at least one memory which program can be executed by the at least one or part of the processors for executing the operations of the method according to embodiments herein.

An embodiment of an ultrasound system provides for an ultrasound system having one or more processing unit, at least a memory in which two programs are stored coding the instructions for configuring the system to operate alternatively according to a traditional Delay and Sum method or to a method according to embodiments herein by selecting through a user interface connected to the one or more processing unit the corresponding program to be executed by the said one or more processing units.

A specific variant embodiment of the above disclosed generic embodiment is shown in FIGS. 16 to 18.

FIG. 16 illustrates a block diagram of an ultrasound system formed in accordance with an alternative embodiment. The system of FIG. 16 implements the operations described herein in connection with various embodiments. By way of example, one or more circuits/processors within the system implement the operations of any processes illustrated in connection with the figures and/or described herein. The system includes a probe interconnect board 1602 that includes one or more probe connection ports 1604. The connection ports 1604 may support various numbers of signal channels (e.g., 128, 192, 256, etc.). The connector ports 1604 may be configured to be used with different types of probe arrays (e.g., phased array, linear array, curved array, 1D, 1.25D, 1.5D, 1.75D, 2D array, etc.). The probes may be configured for different types of applications, such as abdominal, cardiac, maternity, gynaecological, urological and cerebrovascular examination, breast examination and the like.

One or more of the connection ports 1604 may support acquisition of 2D image data and/or one or more of the connection ports 1604 may support 3D image data. By way of example only, the 3D image data may be acquired through physical movement (e.g., mechanically sweeping or physician movement) of the probe and/or by a probe that electrically or mechanically steers the transducer array.

The probe interconnect board (PIB) 1602 includes a switching circuit 1606 to select between the connection ports 1604. The switching circuit 1606 may be manually managed based on user inputs. For example, a user may designate a connection port 1604 by selecting a button, switch or other input on the system. Optionally, the user may select a connection port 1604 by entering a selection through a user interface on the system.

Optionally, the switching circuit 1606 may automatically switch to one of the connection ports 1604 in response to detecting a presence of a mating connection of a probe. For example, the switching circuit 1606 may receive a "connect" signal indicating that a probe has been connected to a selected one of the connection ports 1604. The connect signal may be generated by the probe when power is initially supplied to the probe when coupled to the connection port 1604. Additionally, or alternatively, each connection port 1604 may include a sensor 1605 that detects when a mating connection on a cable of a probe has been interconnected with the corresponding connection port 1604. The sensor 1605 provides signal to the switching circuit 1606, and in response thereto, the switching circuit 1606 couples the corresponding connection port 1604 to PIB outputs 1608. Optionally, the sensor 1605 may be constructed as a circuit with contacts provided at the connection ports 1604. The circuit remains open when no mating connected is joined to the corresponding connection port 1604. The circuit is closed when the mating connector of a probe is joined to the connection port 1604.

A control line 1624 conveys control signals between the probe interconnection board 1602 and a digital processing board 1626. A power supply line 1636 provides power from a power supply 1640 to the various components of the system, including but not limited to, the probe interconnection board (PIB) 1602, digital front end boards (DFB) 1610, digital processing board (DPB) 1626, the master processing board (MPB) 1644, and a user interface control board (UICB) 1646. A temporary control bus 1638 interconnects, and provides temporary control signals between, the power supply 1640 and the boards 1602, 1610, 1626, 1644 and 1646. The power supply 1640 includes a cable to be coupled to an external AC power supply. Optionally, the power supply 1640 may include one or more power storage devices (e.g. batteries) that provide power when the AC power supply is interrupted or disconnected. The power supply 1640 includes a controller 1642 that manages operation of the power supply 1640 including operation of the storage devices.

Additionally, or alternatively, the power supply 1640 may include alternative power sources, such as solar panels and the like. One or more fans 1643 are coupled to the power supply 1640 and are managed by the controller 1642 to be turned on and off based on operating parameters (e.g. temperature) of the various circuit boards and electronic components within the overall system (e.g. to prevent overheating of the various electronics).

The digital front-end boards 1610 providing analog interface to and from probes connected to the probe interconnection board 1602. The DFB 1610 also provides pulse or control and drive signals, manages analog gains, includes analog to digital converters in connection with each receive channel, provides transmit beamforming management and receive beamforming management and vector composition (associated with focusing during receive operations).

The digital front end boards 1610 include transmit driver circuits 1612 that generate transmit signals that are passed over corresponding channels to the corresponding transducers in connection with ultrasound transmit firing operations. The transmit driver circuits 1612 provide pulse or control for each drive signal and transmit beamforming management to steer firing operations to points of interest within the region of interest. By way of example, a separate transmit driver circuits 1612 may be provided in connection with each individual channel, or a common transmit driver circuits 1612 may be utilized to drive multiple channels. The transmit driver circuits 1612 cooperate to focus transmit beams to one or more select points within the region of interest. The transmit driver circuits 1612 may implement single line transmit, encoded firing sequences, multiline transmitter operations, generation of shear wave inducing ultrasound beams as well as other forms of ultrasound transmission techniques.

The digital front end boards 1610 include receive beaformer circuits 1614 that received echo/receive signals and perform various analog and digital processing thereon, as well as phase shifting, time delaying and other operations in connection with beamforming. The beam former circuits 1614 may implement various types of beamforming, such as single-line acquisition, multiline acquisition as well as other ultrasound beamforming techniques.

The digital front end boards 1610 include continuous wave Doppler processing circuits 1616 configured to perform continuous wave Doppler processing upon received echo signals. Optionally, the continuous wave Doppler circuits 1616 may also generate continuous wave Doppler transmit signals.

The digital front-end boards 1610 are coupled to the digital processing board 1626 through various buses and control lines, such as control lines 1622, synchronization lines 1620 and one or more data bus 1618. The control lines 1622 and synchronization lines 1620 provide control information and data, as well as synchronization signals, to the transmit drive circuits 1612, receive beamforming circuits 1614 and continuous wave Doppler circuits 1616. The data bus 1618 conveys RF ultrasound data from the digital front-end boards 1610 to the digital processing board 1626. Optionally, the digital front end boards 1610 may convert the RF ultrasound data to I, Q data pairs which are then passed to the digital processing board 1626.

The digital processing board 1626 includes an RF and imaging module 1628, a color flow processing module 1630, an RF processing and Doppler module 1632 and a PCI link module 1634. The digital processing board 1626 performs RF filtering and processing, processing of black and white image information, processing in connection with color flow, Doppler mode processing (e.g. in connection with polls wise and continuous wave Doppler). The digital processing board 1626 also provides image filtering (e.g. speckle reduction) and scanner timing control. The digital processing board 1626 may include other modules based upon the ultrasound image processing functionality afforded by the system.

The modules 1628-1634 comprise one or more processors, DSPs, and/or FPGAs, and memory storing program instructions to direct the processors, DSPs, and/or FPGAs to perform various ultrasound image processing operations. The R and imaging module 1628 performs various ultrasound related imaging, such as B mode related image processing of the RF data. The RF processing and Doppler module 1632 convert incoming RF data to I, Q data pairs, and performs Doppler related processing on the I, Q data pairs. Optionally, the imaging module 1628 may perform B mode related image processing upon I, Q data pairs. The CFM processing module 1630 performs colour flow related image processing upon the ultrasound RF data and/or the I, Q data pairs. The PCI link 1634 manages transfer of ultrasound data, control data and other information, over a PCI express bus 1648, between the digital processing board 1626 and the master processing board 1644.

The master processing board 1644 includes memory 1650 (e.g. serial ATA solid-state devices, serial ATA hard disk drives, etc.), a VGA board 1652 that includes one or more graphic processing unit (GPUs), one or more transceivers 1660 one or more CPUs 1652 and memory 1654. The master processing board (also referred to as a PC board) provides user interface management, scan conversion and cine loop management. The master processing board 1644 may be connected to one or more external devices, such as a DVD player 1656, and one or more displays 1658. The master processing board includes communications interfaces, such as one or more USB ports 1662 and one or more ports 1664 configured to be coupled to peripheral devices. The master processing board 1644 is configured to maintain communication with various types of network devices 1666 and various network servers 1668, such as over wireless links through the transceiver 1660 and/or through a network connection (e.g. via USB connector 1662 and/or peripheral connector 1664).

The network devices 1666 may represent portable or desktop devices, such as smart phones, personal digital assistants, tablet devices, laptop computers, desktop computers, smart watches, ECG monitors, patient monitors, and the like. The master processing board 1644 conveys ultrasound images, ultrasound data, patient data and other information and content to the network devices for presentation to the user. The master processing board 1644 receives, from the network devices 1666, inputs, requests, data entry and the like.

The network server 1668 may represent part of a medical network, such as a hospital, a healthcare network, a third-party healthcare service provider, a medical equipment maintenance service, a medical equipment manufacturer, a government healthcare service and the like. The communications link to the network server 1668 may be over the Internet, a private intranet, a local area network, a wide-area network, and the like. Furthermore, the network server may operate as a remote processing unit executing a software comprising a program coding the instructions for the networks server to be configures execute the functions for carrying out the method according to embodiments herein. By providing a user interface 1646 unit running a user interface program allowing to select traditional Delay and Sum imaging mode or Back-propagation mode, the user may transfer the control or the image reconstruction process to the network server which runs the software configuring it as a processing unit for example according to the embodiment of FIG. 1.

Similarly, the processing unit or the processing subunits can be provided by one or more of the digital processors, CPU, DSP or GPU which are provided in the Digital processing board 1626 and/or in the main processing board 1644 according to the above description. In this case the program for coding the instructions to configure the said processors in such a way to operate according to the function of one or more of the processing subunits, for example as described in relation to the embodiment of FIG. 15, may be saved in the memories associated to the said processing boards and may be executed alternatively to the program coding the said processing boards for operating according to the Delay and Sum method by selection through the user interface 1674 of the back-propagation imaging mode. The programmable hardware configuration of the system operating according to the Delay and sum imaging method allows for implementation of the back-propagation imaging mode according to embodiments herein as an alternatively selectable operating mode of the system.

The master processing board 1644 is connected, via a communications link 1670 with a user interface control board 1646. The communications link 1670 conveys data and information between the user interface and the master processing board 1644. The user interface control board 1646 includes one or more processors 1672, one or more audio/video components 1674 (e.g. speakers, a display, etc.). The user interface control board 1646 is coupled to one or more user interface input/output devices, such as an LCD touch panel 1676, a trackball 1678, a keyboard 1680 and the like. The processor 1672 manages operation of the LCD touch panel 1676, as well as collecting user inputs via the touch panel 1676, trackball 1678 and keyboard 1680, where such user inputs are conveyed to the master processing board 1644 in connection with implementing embodiments herein.

FIG. 17 illustrates a block diagram of a portion of the digital front-end boards 1610 formed in accordance with embodiments herein and relating to the delay and sum imaging mode. A group of diplexers 1702 receive the ultrasound signals for the individual channels over the PIB output 1708. The ultrasound signals are passed along a standard processing circuit 1705 or to a continuous wave processing circuit 1712, based upon the type of probing utilized. When processed by the standard processing circuit 1705, a preamplifier and variable gain amplifier 1704 process the incoming ultrasound receive signals that are then provided to an anti-aliasing filter 1706 which performs anti-aliasing filtering.

In the embodiment of FIG. 17 an example of the said transformation of the RF data in operation according to the delay and sum imaging mode is disclosed. According to this example, the output of the filter 1706 is provided to an A/D converter 1708 that digitizes the incoming analog ultrasound receive signals. When a continuous wave (CW) probe is utilized, the signals therefrom are from are provided to a continuous wave phase shifter, demodulator and summer 1710 which converts the analog RF receive signals to I, Q data pairs. The CW I, Q data pairs are summed, filtered and digitized by a continuous wave processing circuit 1712. Outputs from the standard or continuous wave processing circuits 1705, 1712 are then passed to beam forming circuits 1720 which utilize one or more FPGAs to perform filtering, delaying and summing the incoming digitized receive signals before passing the RF data to the digital processing board 1726 (FIG. 16). The FPGAs receive focalization data from memories 1728. The focalization data is utilized to manage the filters, delays and summing operations performed by the FPGAs in connection with beamforming. The beamformed RF or I/Q data is passed between the beamforming circuits 1720 and ultimately to the digital processing board 1626.

The digital front-end boards 1610 also include transmit modules 1722 that provide transmit drive signals to corresponding transducers of the ultrasound probe. The beamforming circuits 1720 include memory that stores transmit waveforms. The transmit modules 1722 receive transmit waveforms over line 1724 from the beamforming circuits 1720.

FIG. 18 illustrates a block diagram of the digital processing board 1626 implemented in accordance with embodiments herein. The digital processing board 1626 includes various processors 1852-1859 to perform different operations under the control of program instructions saved within corresponding memories see 1862-1869. A master controller 1850 manages operation of the digital processing board 1626 and the processors 1852-1859. By way of example, one or more processors as the 1852 may perform filtering, the modulation, compression and other operations, while another processor 1853 performs colour flow processing. The master controller provides probe control signals, timing control signals, communications control and the like. The master controller 1850 provides real-time configuration information and synchronization signals in connection with each channel to the digital front-end board 1610.

From the details of the digital processing board 1626 in FIG. 18 it appears more clearly that by providing a program coding the instructions for configuring one or more of the processors 1852-1859 to perform different operations for carrying out the method according to embodiments herein it is possible to program the ultrasound system in order to operate an image reconstruction by back-propagation alternatively to the delay and sum operation mode.

The software program may be split according to the instructions configuring the processors as one of the processing subunits described for example in the embodiment of FIG. 15, obtaining several program modules which can be loaded for recall and execution by the corresponding processor. In an embodiment, a control program for managing the correct workflow of the processing operations as described in relation to one or more embodiments may be stored in the memory associated to the mater controller 1850 and executed by this controller.

It should be clearly understood that the various arrangements and processes broadly described and illustrated with respect to the FIGS., and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the FIGS., which illustrate example methods, devices and program products according to various example embodiments. These program instructions may be provided to a processor of a general-purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) execute program instructions stored in memory (for example, software stored on a tangible and non-transitory computer readable storage medium, such as a computer hard drive, ROM, RAM, or the like).

The processor(s) may execute a set of instructions that are stored in one or more storage elements, in order to process data. The storage elements may also store data or other information as desired or needed. The storage element may be in the form of an information source or a physical memory element within the controllers and the controller device. The set of instructions may include various commands that instruct the controllers and the controller device to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The controller may include any processor-based or microprocessor-based system including systems using microcontrollers, reduced instruction set computers (RISC), application specific integrated circuitry (ASICs), field-programmable gate arrays (FPGAs), logic circuitry, and any other circuit or processor capable of executing the functions described herein. When processor-based, the controller executes program instructions stored in memory to perform the corresponding operations. Additionally, or alternatively, the controllers and the controller device may represent circuitry that may be implemented as hardware. The above examples are exemplary only, and are thus not intended to limit in any way the definition and/or meaning of the term "controller."

Optionally, aspects of the processes described herein may be performed over one or more networks one a network server. The network may support communications using any of a variety of commercially-available protocols, such as Transmission Control Protocol/Internet Protocol ("TCP/IP"), User Datagram Protocol ("UDP") protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet an extranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The embodiments described herein may include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. Ultrasound method for extracting signal components, comprising:
    a) generating an acoustic unfocussed wave and transmitting the said acoustic unfocussed wave into a target region of a body under examination;
    b) receiving the reflected acoustic waves generated by reflection of the said unfocussed wave due to the scatterer in the target region and transforming the said reflected acoustic waves in electric received signals;
    c) applying a Discrete Fourier Transform to received data corresponding to the received signals;
    d) applying correction parameters to the received data transformed by the Discrete Fourier Transform;
    e) backpropagating the transformed received data inside the target region in which the unfocussed acoustic wave has been transmitted;
    f) transforming back the backpropagated data by applying an inverse Discrete Fourier Transform to the said backpropagated data and determining for each spatial location in the target region, a temporal window for which the backpropagated data is representative of the echo backscattered by the given spatial location.

2. Method according to claim 1, wherein the acoustic signals reflected by the target region in response to the unfocussed wave transmitted in the said target region are acquired by a probe having a predetermined number of transducer elements each one forming a receiving channel and the radio frequency data (RF-data) acquired by each channel within a certain depth range corresponding to a certain time range is ordered in a matrix of RF received data, the matrix having the size corresponding to the number of samples in the said time range times the number of probe channels, the method comprising:
    Acquiring a matrix of RF data of size number of receive signal samples times the number of probe channels, in response to the transmission into the target region of the unfocussed wave;
    Performing a Discrete Fourier Transform on the said RF data matrix and compute the corresponding vectors of temporal frequencies $\omega$ and wavenumbers k and generating a frequency and wavenumber domain matrix of the received signals;
    For each depth range inside the target region repeating the following steps:
    Computing a propagation matrix according to a backpropagation algorithm;
    Providing a correction matrix which elements are computed for carrying out at least one of the following corrections:
    Deleting the contributions of evanescent waves from the k-space and/or compensating the distortion of the spectrum of received signals due to frequency-dependent tissue absorption and/or compensating the depth-dependent cut off of spatial frequencies in the received signals, due to the probe finite aperture and/or coping with the directivity of the individual transducers, the said correction matrix being a masking matrix of predetermined regions of the frequency-wavenumber matrix;
    Multiplying element wise the said correction matrix with the data matrix of Discrete Fourier transformed RF signal samples obtaining a data matrix of corrected Discrete Fourier Transformed RF signals;
    Multiplying element wise the propagation matrix by the said data matrix of corrected Discrete Fourier Transformed RF signal samples;
    Performing an inverse Discrete Fourier Transform on the matrix of corrected and backpropagated Discrete Fourier Transformed RF signal samples;
    For every position along the extension of the transducer array considering the signal in a given range of times as representative of the scatterers qualitative or quantitative features at a location along a line at the said position and at each depth along the said line;
    Extracting information about the qualitative or quantitative features of the scatterers in the target region from the signal components relating to spatial locations in said target region.

3. Method according to claim 2, wherein receiving the reflected acoustic waves by means of an array of transducers and transforming the received backscattered acoustic waves in corresponding electric signals comprises the steps of
    Sampling at a predetermined frequency and over a predetermined time interval the received signals of each transducer element and generating a matrix of received radiofrequency signals in the space-time domain, in which each row is formed by signal samples at a certain identical time instant and each line represents the signal samples generated by each transducer element.

4. Method according to claim 2, wherein the criterion for determining which elements of the frequency-wavenumber matrix has to be maintained and not masked away by the masking matrix comprises one or more of the following criteria:
the fact that these elements lead to a signal to noise ratio above a certain minimum threshold;
the spatial frequency range leads to evanescent waves from the frequency-wavenumber domain.

5. Method according to claim 2, wherein the masking matrix corresponds to a Hilbert filter in the frequency-wavenumber domain.

6. Method according to claim 5, characterized in that it is combined with a pixel oriented beamforming technique.

7. Method according to claim 2, wherein the masking matrix is computed by determining values of the elements of the said matrix which due to the point-wise multiplication with the Fourier transformed radiofrequency receive signal samples matrix performs:
Delete the contributions of evanescent waves from the k-space and/or compensating the distortion of the spectrum of received signals due to frequency-dependent tissue absorption and/or compensating the depth-dependent cut off of the spatial frequencies in the received signals, due to the probe finite aperture and/or coping with the directivity of the individual transducers.

8. Method according to claim 2, wherein the masking matrix is computed offline and saved in a memory.

9. Method according to claim 2, wherein a smoothing function is applied to the values of the elements of the masking matrix, which smoothing function assigns to at least elements along the boundaries between regions of the masking matrix corresponding to the regions of the matrix of the data in the frequency-wavenumber domain to be masked and regions of the matrix of the data in the frequency-wavenumber domain to be maintained a value between 0 and 1.

10. A method according to claim 1, wherein a sequence of coded transmit beams is transmitted to the target region and a compression filter is provided for the received reflected acoustic waves.

11. A method according to claim 10, wherein the transmit waves of the sequence of coded transmit waves have different features.

12. Ultrasound system for ultrasound image reconstruction in the spatial and temporal frequency domain, the system comprising:
a probe comprising an array of transducer elements capable of transforming an electric signal in an ultrasound acoustic signal and vice versa capable of transforming acoustic waves falling onto the transducer elements into electric radio frequency receive signals;
a transmit beamformer unit generating electric signals for driving each of the transducer elements of the probe and configured to feed the transducer elements for generating an unfocussed wave directed into a target region;
a radio frequency received signals processing unit configured to process the radio frequency received signals by applying a back-propagation algorithm to the radiofrequency receive signals to reconstruct the structure of the target region from the radio frequency receive signals;
the said radio frequency received signals processing unit comprising:
a first processing subunit configured to apply a Discrete Fourier Transform to the radio frequency received data;
a second processing subunit configured to construct a back-propagation function to be applied to the transformed radio frequency received signals;
a third processing subunit configured to apply an inverse Discrete Fourier Transform to the transformed radiofrequency received signals;
a fourth processing subunit configured to calculate in real time or to store a correction function of the radiofrequency received signals and to process the said radio frequency received signals before feeding the said signals to the second processing sub unit;
an information extraction subunit configured to process the signal components relating to the spatial positions in the target region for extracting qualitative and/or quantitative information about the scatterers at these positions.

13. Ultrasound system according to claim 12, wherein the processing unit and the processing subunits are in the form of generic hardware comprising a generic processor and peripherals and a memory for storing software programs coding the instructions to the generic hardware processor for configuring the processor and the peripherals in order to carry out the functions of the said subunits.

14. Ultrasound system according to claim 13, wherein the said generic hardware processor can be a GPU a DSP or another kind of microprocessor combined with a memory for storing the executable program comprising coding the instructions for executing the tasks of the processing units and subunits.

15. Ultrasound system comprising one or more processors, at least a memory for storing a program coding the instructions to the one or more processors to configure the system for operating according to a delay and sum imaging method and for storing a program coding the instructions to the one or more processors to configure the system for operating according to a backpropagation method according to claim 1, a user interface comprising input devices for selecting alternatively the delay and sum imaging method or the back propagation imaging method.

16. A program stored in a portable storage device the program coding the instructions for configuring one or more processing units to carry out the steps of the method according to claim 1 and optionally the functions of the delay and sum imaging method.

17. Method according to claim 2, wherein the extracting comprises generating an image by using the scatterer intensities at each of said locations.

18. A method according to claim 11, wherein the different features comprise different steering angles.

19. Ultrasound system according to claim 12, wherein the information extraction subunit is configured to generate image data of the structure of the target region from the signals determined by the said third processing subunit.

20. Ultrasound system according to claim 12, wherein the structure of the target region is the distribution of the scatterers in the target region.

* * * * *